(12) United States Patent
May

(10) Patent No.: US 10,816,027 B2
(45) Date of Patent: Oct. 27, 2020

(54) STEP THREADS

(71) Applicant: Michael Paul May, Perry, UT (US)

(72) Inventor: Michael Paul May, Perry, UT (US)

(73) Assignee: Michael Paul May, Perry, UT (US)

( * ) Notice: Subject to any disclaimer, the term of this patent is extended or adjusted under 35 U.S.C. 154(b) by 262 days.

(21) Appl. No.: 16/025,987

(22) Filed: Jul. 2, 2018

(65) Prior Publication Data

US 2018/0335070 A1   Nov. 22, 2018

(51) Int. Cl.
*F16B 33/02* (2006.01)
*F16B 37/08* (2006.01)
*F16B 2/06* (2006.01)

(52) U.S. Cl.
CPC ............. *F16B 33/02* (2013.01); *F16B 2/065* (2013.01); *F16B 37/085* (2013.01)

(58) Field of Classification Search
CPC ..... F16B 33/02; F16B 37/085; F16B 37/0807
USPC .......................... 411/417, 418, 437
See application file for complete search history.

(56) References Cited

U.S. PATENT DOCUMENTS

| | | | | |
|---|---|---|---|---|
| 2,138,245 A | * | 11/1938 | Smith | B25B 5/101 269/185 |
| 3,110,755 A | * | 11/1963 | Esser | H01R 4/22 174/87 |
| 3,346,279 A | * | 10/1967 | Stachiw | F16L 49/00 285/353 |
| 3,842,877 A | * | 10/1974 | Andrews | F16B 37/085 411/277 |
| 4,019,711 A | | 4/1977 | Altenhof | |
| 4,479,748 A | | 10/1984 | Uhlmann | |
| 4,619,569 A | | 10/1986 | Wright | |
| 4,637,175 A | | 1/1987 | Froening | |
| 4,721,220 A | * | 1/1988 | Northup | B65D 41/04 215/307 |
| 4,781,507 A | | 11/1988 | Duenas | |
| 5,094,618 A | | 3/1992 | Sullivan | |
| 5,667,870 A | * | 9/1997 | McCullough | B29C 45/2618 257/706 |
| 6,811,364 B2 | * | 11/2004 | Kelzer | B23B 31/1122 411/383 |
| 6,860,688 B2 | | 3/2005 | Bushell | |
| 7,293,936 B1 | | 11/2007 | Warren | |
| 7,344,346 B2 | | 3/2008 | Hsu | |
| 7,478,986 B2 | | 1/2009 | Bushell | |
| 8,266,737 B1 | | 9/2012 | Goettl | |

(Continued)

*Primary Examiner* — Flemming Saether

(57) ABSTRACT

Intermittent screw thread geometry with a rapid step-wise lead feature when external threads are engaged with internal threads of reflective geometry. In an embodiment, thread segments are alternated with unthreaded segments of equal arc length along a helical path of a single-start thread form which results in an odd number of alternating thread/gap features along the helical path per revolution of the thread body. When such external intermittent threads engage internal intermittent threads of reflective geometry, an external thread body can be axially advanced or retracted through an internal thread body in a rapid step-wise fashion by turning the external thread body in either the clockwise or counter-clockwise direction, or in both directions alternately, with respect to the internal thread body when a net axial force is applied to the external threaded body with respect to the internal thread body in the desired linear direction of travel.

7 Claims, 18 Drawing Sheets

(56) References Cited

U.S. PATENT DOCUMENTS

| | | |
|---|---|---|
| 8,348,576 B1 | 1/2013 | Gaw |
| 8,382,415 B1 | 2/2013 | Goldbaum |
| 8,602,371 B2 | 12/2013 | Shaffer |
| 8,845,256 B2 | 9/2014 | Gaw |
| 9,068,369 B1 | 6/2015 | Goettl |
| 9,140,285 B2 | 9/2015 | Burton |
| 9,359,112 B2 | 6/2016 | Hadar |
| 9,719,549 B2 | 8/2017 | Kondo |

* cited by examiner

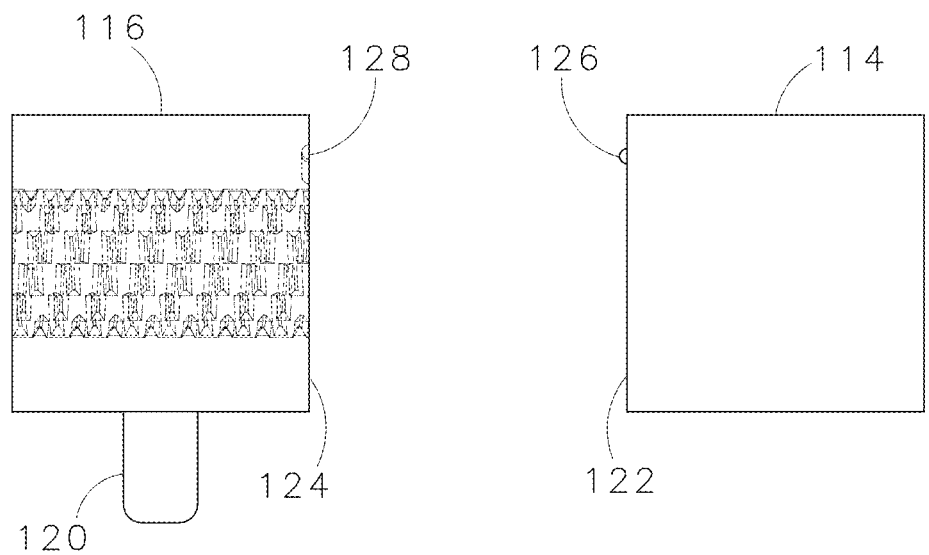
FIG. 46
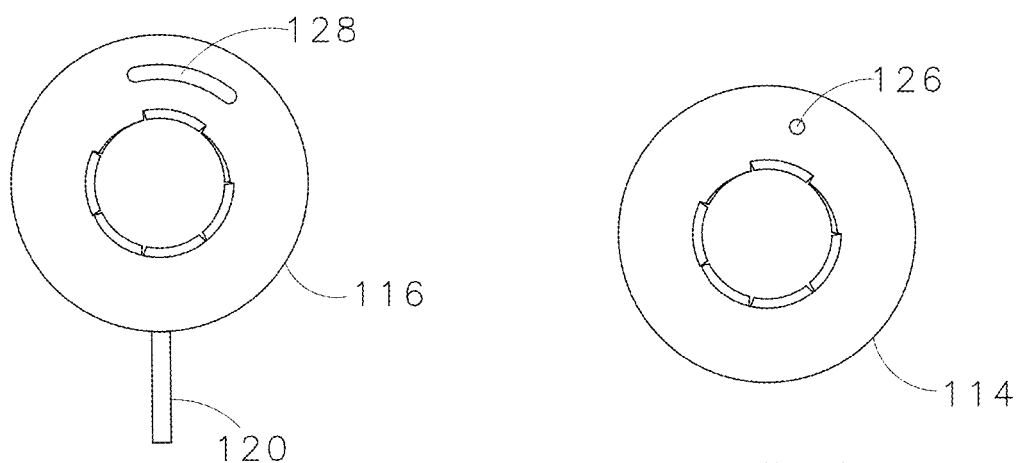
FIG. 47
FIG. 48

STEP THREADS

FIELD OF THE DISCLOSURE

The present disclosure relates generally to threaded fasteners and, more particularly, to fasteners that utilize intermittent screw thread geometry to attain special characteristics such as rapid axial advancement and retraction, quick conversion from rapid axial advancement mode to continuous threading mode, universal methods of assembly, and reduced thread stripping capacity.

BACKGROUND OF THE DISCLOSURE

Machine screw threads, such as those found in hex and socket-head cap screws and bolts, may have threads which are single-start, double-start, triple-start, and so forth. The number of starts built into a machine screw thread determines the amount of lead per revolution of a bolt or threaded rod that is engaged with a nut or other internally-threaded component. Lead is defined as the axial distance that an external screw-threaded component travels, per revolution, with respect to an internal screw-threaded component with which it is engaged. As such, screw threads with an increased number of thread starts will provide a more rapid advancement and retraction of a bolt or threaded rod within a nut or other internally-threaded receptacle with which it is engaged. In the current art, most single-start, double-start, triple-start, etc. thread forms are of a continuous helical thread geometry with no gaps in the thread form as the threads spiral in a helical fashion around the shank of a bolt or threaded rod or on the inside cylindrical surface of a nut or other internally-threaded receptacle with which the bolt or threaded rod engages.

One purpose of double-start and triple start thread forms is to provide a rapid advance and retract feature for a bolt or screw in cases where rapid assembly and disassembly of the threaded fastener may be desired. A typical single-start thread form may include a bolt engaged with a nut or a threaded rod engaged with an internally-threaded receptacle in which the external thread form will advance or retract with respect to the internal thread form by an axial distance equal to the linear distance between the thread peaks, also known as the thread pitch, per every revolution of the external thread body with respect to the internal thread body. This axial distance of advancement or retraction of an externally-threaded body within an internally-threaded body is known as lead. In the case of a double-start thread, a bolt or threaded rod will advance or retract twice the pitch distance of the threads per revolution in which case the lead is two times the thread pitch. And in the case of a triple-start thread, the bolt or threaded rod will advance or retract three times the pitch distance between the thread peaks per revolution of the bolt or threaded rod, and so forth.

In the assembly of screw threaded fasteners, there may be applications where a quicker or more universal assembly method may be desired than what the double-start or triple-start continuous thread forms have to offer. This may include applications where a bolt or threaded rod needs to be threaded into a hole quickly to bear primarily shear loads. Quick-fastening devices are known in the prior art. For example, U.S. Pat. No. 4,619,569 entitled, "Quick release fastener with intermittent threads", describes a thread form with continuous slots cut along the axial direction of an external thread form to remove all the threads along the entire pathway of each slot. This patent claims an externally-threaded fastener that can be inserted completely through the mating internal thread body to the depth desired and then turned one-quarter turn to engage all the external thread segments with all the internal thread segments. In this case, the intermittent thread segments on both thread bodies are aligned in rows parallel to the axis of the fastener assembly with no gaps between the thread segments that are aligned in the axial direction of either threaded body.

Other intermittent thread forms are known in the art. For example, U.S. Pat. No. 5,094,618 titled "Intermittent Dental Thread Posts" teaches intermittent thread geometry in which thread segments are separated by gaps on the helical thread path of an externally-threaded dental post. However, this intermittent thread design differs vastly in its intent and purpose from the intermittent thread geometry revealed in this disclosure. Please see the "Prior Art" section at the end of this report for an itemized list of differences identified between the '618 patent and the intermittent thread geometry in this disclosure.

It may be expedient in an application that an externally-threaded fastener be advanced or retracted within an internal thread body by turning one of the components in either the clockwise or counterclockwise direction, or both directions alternately. This may include applications where space constraints in an assembly require that a bolt or threaded rod with a right-handed thread be engaged and advanced within a mating internal thread by turning the bolt or threaded rod in the counter-clockwise direction while applying a slight axial force in the engagement direction. Or, conversely, that a bolt or threaded rod with a left-handed thread be advanced within an internal thread by turning the bolt or screw in the clockwise direction while applying a slight axial force in the engaging direction. Additionally, space limitations may require that a bolt or threaded rod be advanced into, or retracted from, an internal thread body by turning in both the clockwise and counter-clockwise directions alternately within the confines of a small range of angular freedom that may be available in an assembly application. These universal methods of assembly of threaded fasteners, inherent to the intermittent thread design revealed in this disclosure, would also provide a more ergonomic method of fastener assembly, as the fingers of the hand would never have to release the bolt or screw head to reposition on the bolt head to make each subsequent partial turn.

Further, there may be applications where a reduced thread stripping capacity may be desired of a threaded fastener. An example would be fasteners that are used to attach street and highway signs to their posts. In some cases, such fasteners are designed specifically to shear in excessively high winds so that the signs can break away from one or more of their attachment points to prevent damage from occurring to either the sign or the post(s) to which they attach. Previous solutions included notching around the circumference of a bolt shank or pin to provide a weakened area for the shearing of a fastener under a predetermined excessive load.

There may also be applications where a combination of externally and internally threaded components may be combined to yield a device which can be quickly switched between a rapid lead mode and a normal thread pitch lead mode of an externally-threaded component within an internally-threaded component. Such applications may include a c-clamp where it would be useful to advance the clamping rod of the c-clamp quickly up to the surface of the objects being clamped before making a quick adjustment to enable a normal thread pitch lead of the clamping rod for performing the clamping of the objects. For example, U.S. Pat. No. 4,781,507, entitled, "Quick acting threaded fastener assembly", describes a threaded fastener assembly that uses two identical half nuts with alternating internal threaded and grooved portions in addition to a threaded rod with intermittent threaded and land portions, to enable the quick release or clamping action of a c-clamp.

There may also be applications in automation equipment where a controlled linear step displacement, or a combination of linear step and rotational displacements, may call for the mechanical features offered by a combination of intermittently-threaded external and internal thread bodies.

It should be appreciated that the solution of any particular problem is not a limitation on the scope of this disclosure or of the attached claims except to the extent expressly noted herein. Additionally, this background section discusses problems and solutions noted by the inventors; the inclusion of any problem or solution in this section is not an indication that the problem or solution represents known prior art except that that the contents of the indicated patent represent a publication. With respect to the identified patents, the foregoing summary thereof is not intended to alter or supplement the prior art document itself; any discrepancy or difference should be resolved by reference to the document itself.

SUMMARY OF THE DISCLOSURE

According to one embodiment, thread segments alternate with unthreaded sections of equal arc length along a helical path on an external thread body or in an internal thread body in a configuration such that an odd number of alternating thread/gap features exist along the thread path per one revolution of the thread body when a single-start thread form is employed. When an external intermittent thread body thus defined engages an internal intermittent thread body with threads that are a reflection of the thread form of the external intermittent thread body, the external intermittent thread body may be axially advanced or retracted relative to the internal intermittent thread body in a step-wise fashion by turning the external thread body in either the clockwise or the counterclockwise direction as a force is applied in the desired axial direction of travel. In this disclosure, the term "step thread" or "step-threaded" will be used to reference the intermittent thread geometry thus defined. Another feature of the "step thread" design is that an external step-threaded body will spin in place without advancing or retracting with respect to an internal step-threaded body when there is no net axial force acting on either body. Per this disclosure, "net axial force" is defined as the resultant axial force of an external thread body with respect to an internal thread body, or vice-versa. In addition, said intermittent thread forms may include a short length of continuous threads at one end of an external step-threaded or internal step-threaded body to provide a continuous uninterrupted thread path for one or more of the last threads at the end of the thread travel to ensure stability during tightening.

According to another embodiment, the intermittent screw thread geometry in this disclosure enables a rapid, step-wise lead feature when external threads are engaged with internal threads of reflective geometry.

According to yet another embodiment, intermittent screw thread geometry is provided with a reduced axial load-bearing capacity for applications where thread stripping is desired at loads less than the stripping capacity provided by continuous threads.

According to yet another embodiment, an external step-threaded body can be threaded through two or more contiguous internal step-threaded bodies to enable either a rapid step-wise lead feature of the externally-threaded body with respect to the one or more internal step-threaded bodies; or the continuous uninterrupted threading of an external step-threaded body with respect to one or more internally-threaded bodies according to the pitch distance of the threads, or thread lead. This mode switch is made possible by a slight rotation of a second internally-threaded body with respect to a first internally-threaded body, and so forth.

For the purpose of this disclosure, "step-threaded body" or "step-threaded geometry" may be used interchangeably to refer to either an external step-threaded body or an internal step-threaded body according to the context in which the terms are used. Also for the purpose of this disclosure, "contiguous", when used in reference to multiple arranged internal step-threaded bodies, will be meant to define a configuration of two or more internal step-threaded bodies that are translationally fixed with respect to each other along their common axis but are rotationally oriented with respect to each other to yield certain characteristics and functionality with respect to the external threaded body passing through them. On this wise, the verbiage "internal step-threaded bodies are aligned" will refer to the condition of enabling the step-wise lead function of an external step-threaded body as it passes through two or more internal step-threaded bodies simultaneously. Conversely, the verbiage "internal step-threaded bodies are offset" will refer to the condition of disabling the step-wise lead function and enabling a continuous uninterrupted threading mode for an external step-threaded body passing through two or more internal step-threaded bodies simultaneously.

These and other aspects and features will become more readily apparent upon reading the following detailed description taken in conjunction with the accompanying drawings. Although various features are disclosed in relation to specific exemplary embodiments, it is understood that the various features may be combined with each other, or used alone, with any of the various exemplary embodiments without departing from the scope of the disclosure.

BRIEF DESCRIPTION OF THE DRAWINGS

FIG. 46 is an exploded view of the two contiguous internal step-threaded couplings illustrated in FIG. 45;

FIG. 47 is a plan view of the left-hand internal step-threaded coupling of FIG. 46 as viewed axially from the face that includes the detent groove which the button on the face of the right-hand coupling of FIG. 48 engages to define the amount of relative rotation prescribed for the second internal step-threaded coupling with respect to the first internal step-threaded coupling for the purpose of enabling either the step-wise lead mode or the continuous threading mode of the clamp rod through both couplings;

FIG. 48 is a plan view of the right-hand internal step-threaded coupling of FIG. 46 as viewed axially from the face that includes the button which engages the detent groove in the face of the left-hand coupling of FIG. 46 to define the amount of relative rotation prescribed for the first internal step-threaded coupling with respect to the second internal step-threaded coupling for the purpose of enabling either the step-wise lead mode or the continuous threading mode of the clamp rod through the couplings;

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

The present disclosure provides intermittent screw thread geometry that that can be incorporated into various known devices to yield characteristics which would be useful when used in machinery and in hardware such as screw thread fasteners, clamping devices, linear-rotational positioning equipment, and other devices where a step-wise lead feature for threaded body advancement and retraction may be desired. These characteristics may include 1) the ability to rapidly advance or retract an externally-threaded body within an internally-threaded body via a step-wise lead feature when a net axial force is applied to the external threaded body in the desired direction of travel; 2) the ability to switch from a rapid step-wise lead mode to a continuous threading mode enabled by two or more internally-threaded bodies engaged by a single externally-threaded body; 3) a reduced stripping torque for threaded fasteners when a thread strength less than that of a continuously-threaded fastener is desired; and 4) other features enabled by the step-threaded geometry disclosed herein. Each of these features, and the devices to which they may apply, will be addressed and explained in the following disclosure.

Reference will now be made in detail to specific embodiments or features of this invention, examples of which are illustrated in the accompanying drawings. Generally, corresponding reference numbers will be used throughout the drawings to refer to the same or corresponding parts.

Figure 1:
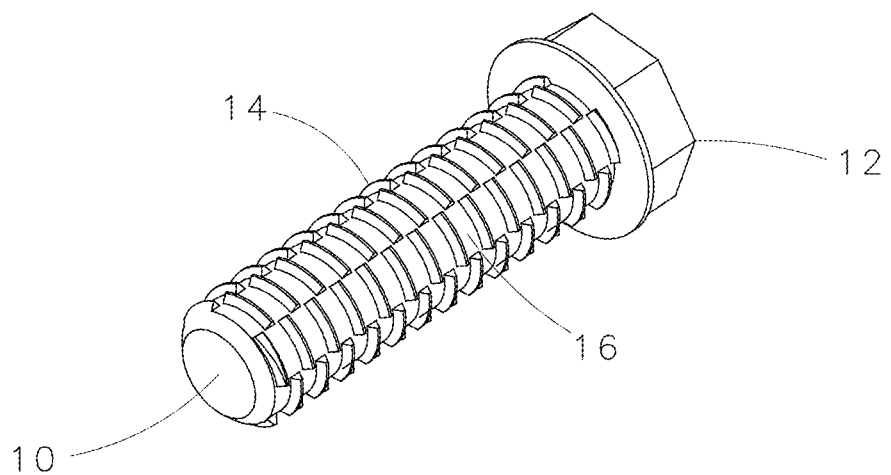
FIG. 1 is a perspective view of an external step-threaded body such as a bolt or cap screw utilizing the step thread geometry.
Figure 2:
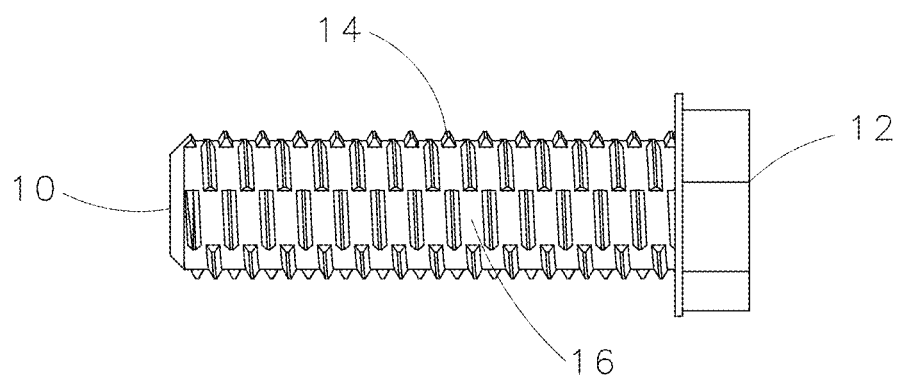
FIG. 2 is a plan view of an external step-threaded body such as a bolt or cap screw utilizing the step thread geometry.

FIGS. 1 and 2 illustrate an exemplary single-start external helical screw thread body with the disclosed intermittent or "step thread" geometry incorporated. In an embodiment, an external thread body may consist of a shank 10 and a head 12. The geometry may include thread segments 14 that alternate with unthreaded sections 16 of identical arc length along a helical thread path which results in an odd number of alternating thread/gap features along the thread path per revolution of the thread body. In this example, the number of alternating thread/gap features along the helical thread path per revolution of the thread body is seven. For intermittent threads to be successfully incorporated into a single-start thread form to enable the step-wise lead feature disclosed herein, an odd number of thread/gap segments of equal arc length are necessary when an external step-threaded body is engaged with an internal step-threaded body of reflective geometry. When external step threads engage internal step threads of reflective geometry in a single-start thread form, the external step-threaded body can be axially advanced or retracted relative to an internal thread body in a rapid, step-wise fashion by turning the external step-threaded body in either the clockwise or counterclockwise direction as an axial force is applied to the external step-threaded body in the desired direction of travel. In the exemplary model of FIG. 1, the external step-threaded body can be axially advanced within an internal step-threaded body approximately seven times the pitch distance of the threads per revolution, making it possible to thread the external step-threaded body into the internal step-threaded body at a rate of seven times that of a conventional single-start thread. This is made possible by the intermittent thread segments in the external step-threaded body aligning with, and passing through, the intermittent thread gaps in an internal step-threaded thread body as a first thread body is rotated relative to a second thread body so that the first thread body can axially "step" up or "step" down one thread pitch with respect to a second thread body per every one-seventh revolution of the external step-threaded body with respect to the internal step-threaded body when a net axial force is applied to either thread body. With each step-wise lead of the external step-threaded body with respect to the internal step-threaded body, the thread segments in a first step-threaded body step down or step up in between the thread gaps in a second thread body to contact the next set of offset thread segments in the second step-threaded body. At that point, with the thread segments in the first step-threaded body aligned and in contact with the thread segments in the second step-threaded body, the first step-threaded body can continue to be rotated until contact is again lost between the thread segment faces in both step-threaded bodies so that thread segments in the first step-threaded body are once again aligned with the gaps in the second step-threaded body so that the first step-threaded body is able to "step" up or "step" down through the gaps in the second step-threaded body to once again achieve the next stage of step-wise lead of the first step-threaded body with respect to the second step-threaded body when a net axial force is applied to one of the step-threaded bodes in the desired axial direction of travel.

Figure 4:
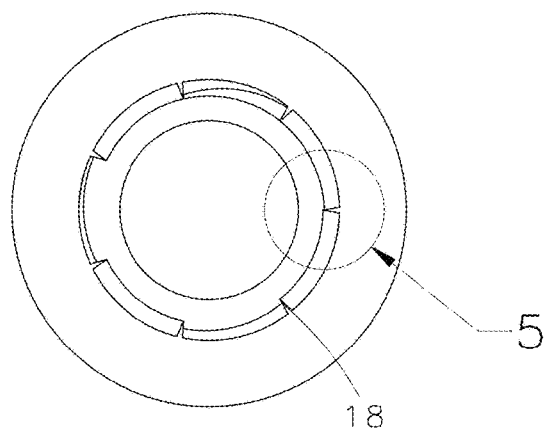
FIG. 4 is an axial plan view of FIG. 3 in the indicated direction.
Figure 3:
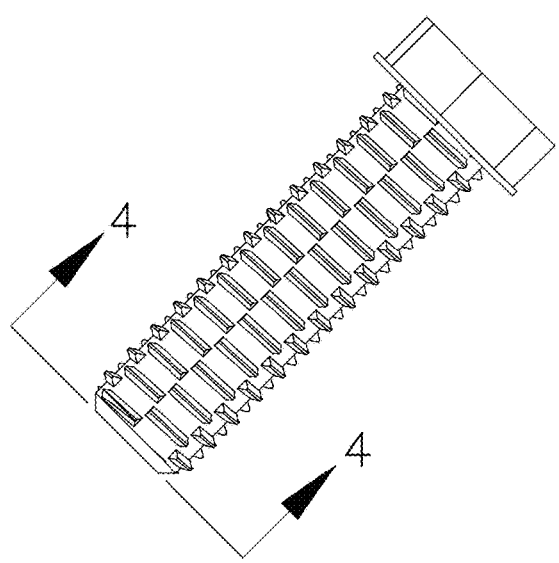
FIG. 3 is a plan view of an external step-threaded body such as a bolt or cap screw from which the axial plan view of FIG. 4 is taken.
Figure 5:
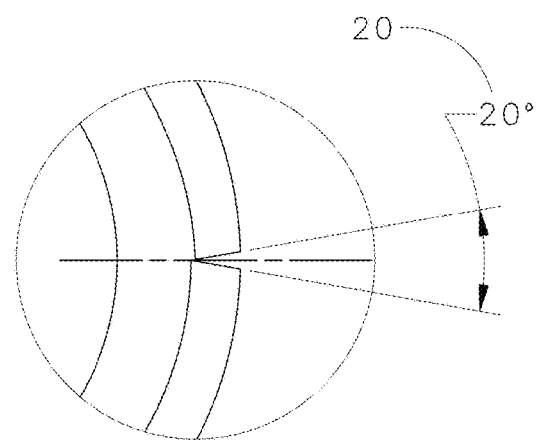
FIG. 5 is a partial view of FIG. 4 providing details of the end relief required on the ends of the thread segments on an external step-threaded body.

FIG. 3 is another plan view of the exemplary, single-start external step-threaded body from which the end view of FIG. 4 is generated. FIG. 4 illustrates the alternating thread-gap geometry from an axial, or end view perspective with the location of the start point 18 of the single-start thread identified, while the partial view FIG. 5 illustrates the geometry which must be incorporated onto the ends of the thread segments to enable a reliable functioning of the step-wise lead feature. FIG. 5 reveals that a cut angle 20 of approximately 20° or so must exist between the faces of the ends of all thread segments to provide sufficient clearance for the step thread segments on an external step-threaded body to reliably pass through the gaps in the reflective geometry of an internal step-threaded body, and vice-versa. This is necessary since the thread segments and gaps in both the external and internal thread bodies are all equal in arc length as measured along the thread pitch diameter line. It is noted here that the cutback angle on each thread segment end face could be more or less than the 10 degrees incorporated in the exemplary model depending upon the thread shape and the external/internal thread clearances. Similar relief angles must also be cut or formed into the reflective thread segments in the internal thread body to provide the necessary clearance between the ends of the thread segments in the external and internal thread bodies to allow the segments to pass by each other axially to enable the step-wise lead function. It is noted here that other geometry, such as a radius or a multi-faceted bevel, etc., could be formed or cut on the ends of all thread segments to provide the relief and clearance necessary to allow the thread segments of an external step-threaded body to pass through the gaps of an internal step-threaded body of reflective geometry, and vice-versa.

Figure 6:
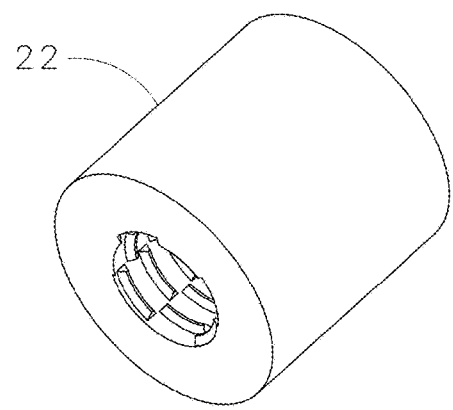
FIG. 6 is a perspective view of an internal step-threaded body such as a coupling or nut utilizing the step thread geometry.
Figure 8:
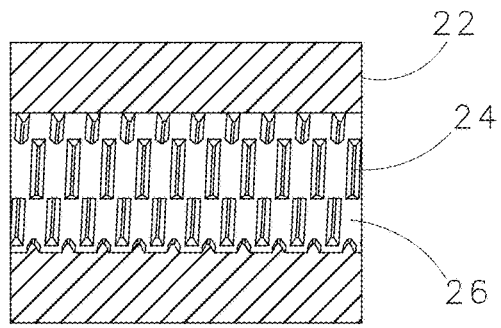
FIG. 8 is a section view of FIG. 7 in the indicated direction.
Figure 7:
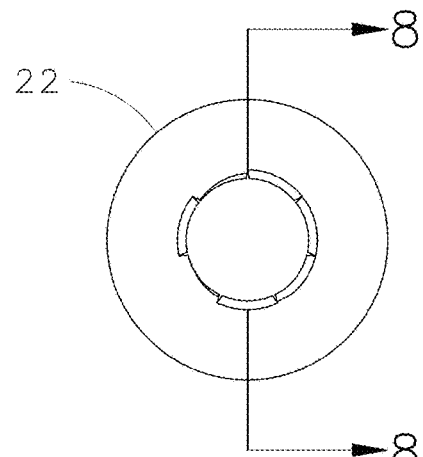
FIG. 7 is an axial plan view of an internally-threaded body such as a coupling or nut.

FIG. 6 is a perspective view of an exemplary internal step-threaded body 22 with the previously disclosed intermittent or "step" thread geometry incorporated. FIG. 7 is an axial or end view of the exemplary internal step-threaded body from which the section view of FIG. 8 was taken. The exemplary model of FIG. 6 represents any solid body that may include the internal intermittent or "step" thread geometry, including nuts, couplings, or any internally-threaded substrate into which an external thread body could be screwed. In FIG. 8, thread segments 24 alternate with unthreaded sections, or "gaps" 26 of identical arc length along a helical path which results in an odd number of alternating thread/gap features along the helical thread path per revolution of the internally-threaded body. It is noted that the internal step-threaded geometry is "reflective" of the external step thread geometry in the sense that the thread segments and gap sections in both threaded bodies are equal in arc length as measured along the helical path of the thread pitch diameter line. In this example, the number of alternating thread/gap features along the helical path per revolution of a thread body is seven. It was previously explained that an odd number of thread/gap segments of equal arc length are required for the step-wise lead feature to work when a single-start, external step-threaded body is engaged with an internal step-threaded body of reflective geometry. For an external or internal single-start step-threaded body, if an even number of thread/gap segments per revolution were to be incorporated, then all the thread segments would be aligned in the axial direction of the eternal or internal step-threaded body. Thus, thus the thread segments would not be separated by gaps in the axial direction for the step-wise lead feature to work. In this case, all the gaps would be aligned axially, creating one or more continuous gaps running the entire axial length of the thread body. However, when an odd number of thread/gap segments per revolution are incorporated into a single-start external thread form as heretofore explained, the external thread body can be axially advanced or retracted relative to the internal thread body in a step-wise fashion by turning the external thread body in either the clockwise or the counterclockwise direction while applying an axial force in the desired direction of travel. Per the internal step thread geometry illustrated in the exemplary model in FIG. 6, an external thread body of reflective geometry can be axially advanced or retracted within the internal step-threaded body by a distance equal to the number thread/gap segments per revolution of the thread body times the pitch distance of the threads, making it possible to thread an external step-threaded body into an internal step-threaded body at a rate approximately seven times that of a conventional, single-start threaded body.

Figure 10:
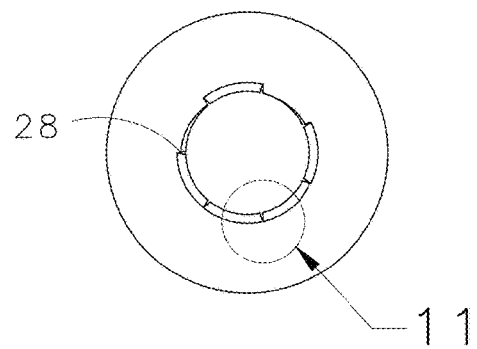
FIG. 10 is an axial plan view of FIG. 9 in the indicated direction.
Figure 9:
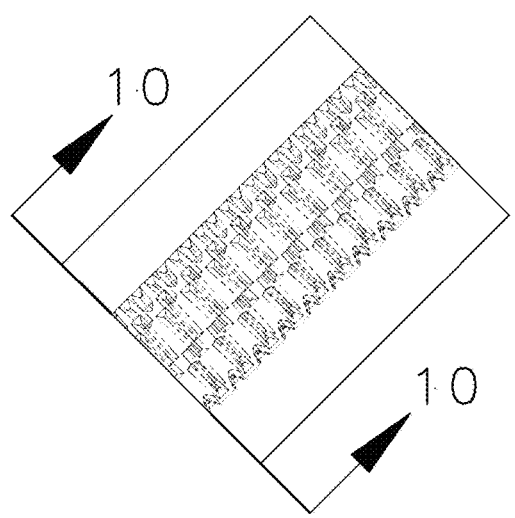
FIG. 9 is a plan view of an internal step-threaded body such as a coupling or nut from which the axial plan view of FIG. 10 is taken.
Figure 11:
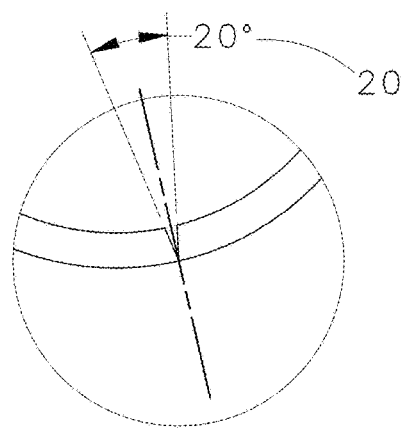
FIG. 11 is a partial view of FIG. 10 providing details of the end relief required on the ends of the thread segments inside an internal step-threaded body.

FIG. 9 is another plan view of the exemplary internal single-start, step-threaded body from which the axial view of FIG. 10 is generated. FIG. 10 illustrates the alternating thread/gap geometry from an end view perspective with the location of the start point 28 of the internal single-start thread identified, while the partial view FIG. 11 illustrates geometry which must be incorporated onto the ends of thread segments to enable a reliable functioning of the step-wise lead feature. FIG. 11 reveals that a cut angle 20 of approximately 20° or so must exist between the faces of the ends of all thread segments to provide sufficient clearance for the step thread segments in an internal step-threaded body to reliably pass through the gaps in the reflective geometry of an external step-threaded body. This is necessary since the thread segments and gaps in both the external and internal thread bodies are all equal in arc length as measured along the helical path of the thread pitch diameter line. It is noted here that the cutback angle on each thread segment end face could be more or less than the 10 degrees incorporated into the exemplary model depending upon the thread shape and the external/internal thread clearances. As noted earlier, similar relief angles must also be cut or formed into the reflective thread segments on the external thread body to provide the necessary co-clearance between the thread segment ends in the internal and external thread bodies to allow the segments to pass through each other to enable the step-wise lead feature. Also noted earlier, other thread-end geometry such as a radius or a multi-faceted bevel, etc., could be formed or cut on the ends of the thread segments to provide the relief and clearance necessary to allow the thread segments of an internal step-threaded body to pass through the gaps of an external step-threaded body of reflective geometry, and vice-versa.

Figures 12, 13:
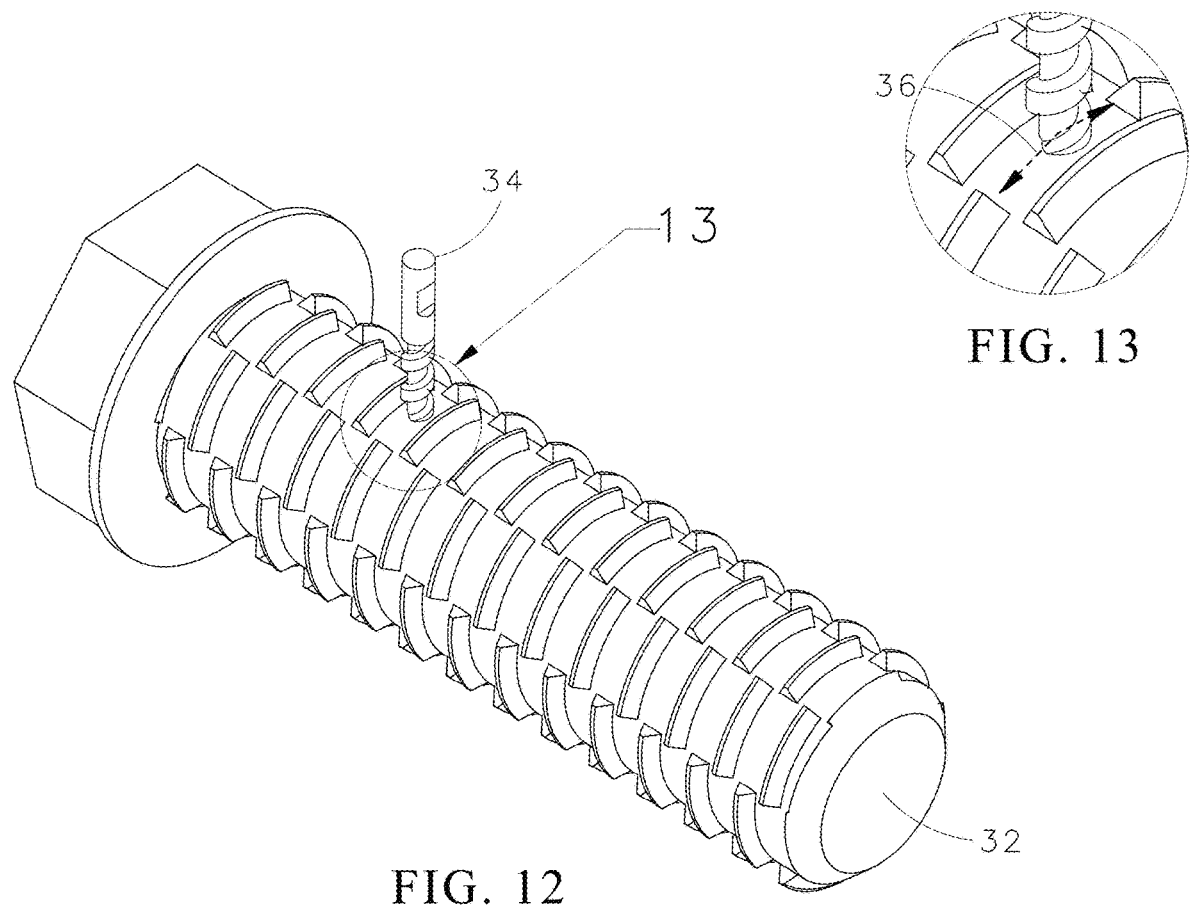
FIG. 12 is a perspective view of an external step-threaded body with an exemplary cutting tool in position to machine the gaps between the thread segments.
FIG. 13 is a partial view of FIG. 12 of the path that a tool such as an end mill would take to create the gaps required to produce the step-thread geometry from a continuously-threaded body such as a conventional bolt or threaded rod.

FIG. 12 is a perspective view of an exemplary external thread body 32 with a cutting tool 34 illustrated which could be used to machine the gaps in a continuous thread form to create step threads on an externally-threaded body. FIG. 13 is a partial view of FIG. 12 with a diagram of a path 36 that an end-mill style cutting tool could take to machine the gaps in an external continuous thread to create the external step-thread geometry. As an example of using this method to create gaps in external continuous thread geometry, the end mill cutting tool would be held in a fixed location by the machine tool while an indexing chuck within the machine tool precisely rotates the threaded body within a prescribed angle so that the cutting tool can remove the material from the continuous thread form to create the gaps. Other methods and tooling could also be identified to create the gaps in internal continuous thread geometry; or both the external step-threaded and internal step-threaded components could be manufactured by 3D printing, sintered powder technology, or other modern methods of economically producing parts with complex geometry.

Figure 14:
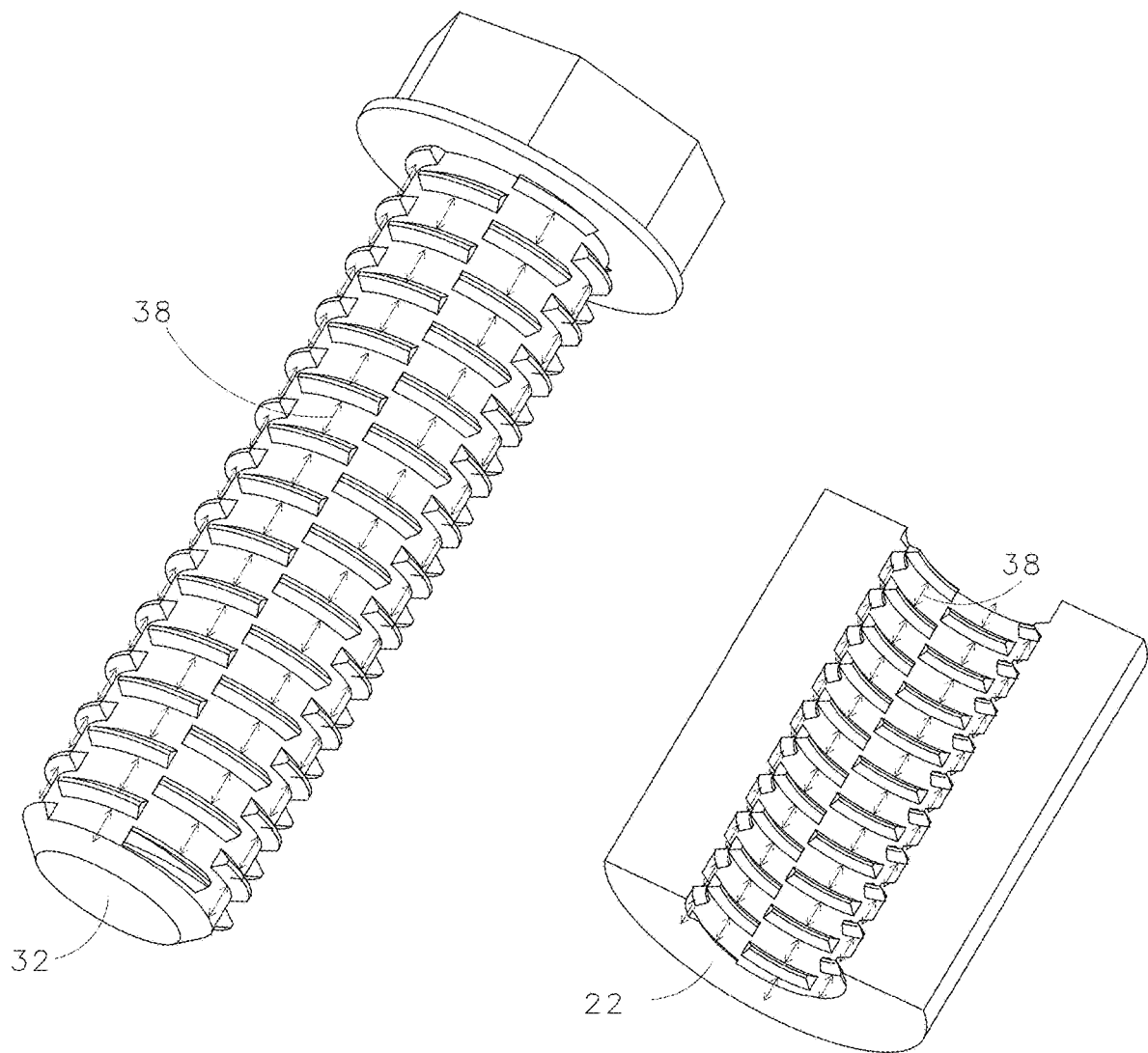
FIG. 14 is a diagrammatic view of the step paths created on an external and in an internal step-threaded bodies via the machining operation illustrated in FIG. 13 which enable the step-wise lead feature when the thread segments of an external step-threaded body align with the gaps on the internal step-threaded body.

FIG. 14 is a perspective, diagrammatic view of an exemplary external step-threaded body 32 that illustrates the paths of axial travel 38 that are enabled by the intermittent thread geometry. FIG. 14 also includes a half-section of the exemplary internal step-threaded body 22 that illustrates the paths of axial travel 38 for the thread segments of the reflective external step-threaded geometry. Arrows 38 indicate the gaps that must exist between the thread segments in a single-start, external step-threaded body to enable the thread segments of the reflective geometry of an internal step-threaded body to pass through in a step-wise fashion when the thread segments of one body and the gaps of the other body are aligned as a result of the revolution of either thread body with respect to the other as a net axial force is applied to either body in the desired direction of axial travel. Thus, due to the nature of the step-thread geometry disclosed herein, alternating rotational and translational displacements are required to continually advance or retract an external step-threaded body within an internal step-threaded body in a step-wise fashion, and vice-versa.

Figure 15:
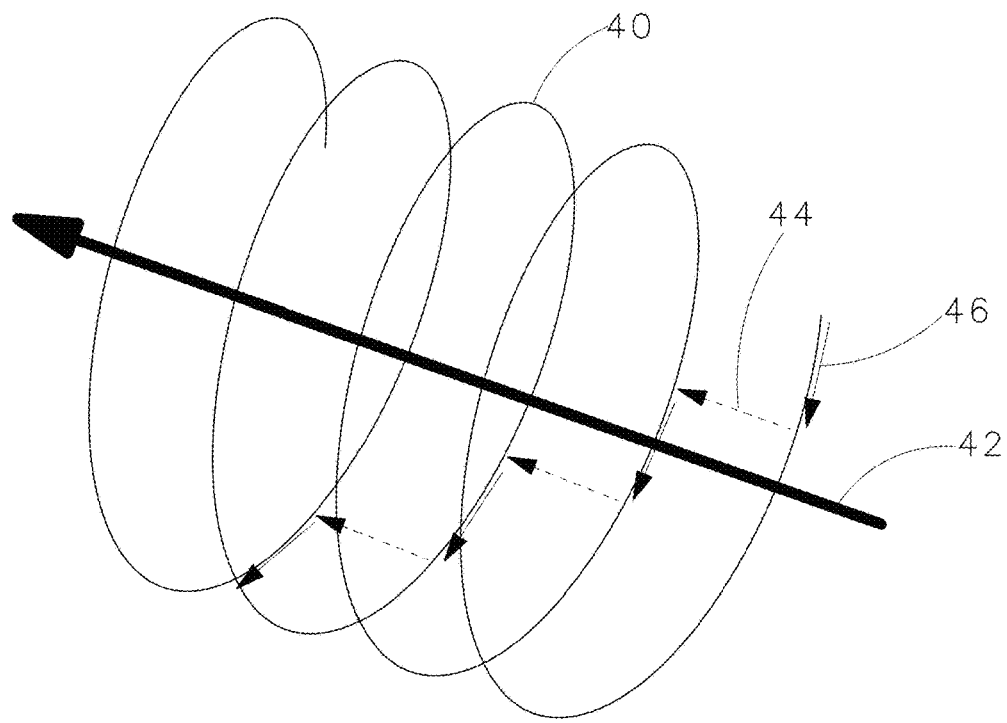
FIG. 15 is a diagrammatic view of the path that a point on an external step-threaded body would take through an internal step-threaded body as right-hand threads are turned in the clockwise direction when an axial force is applied in the direction of engagement.

FIG. 15 is a diagrammatic view of the path that a point on an external step-threaded body with a single-start thread form would take through an internal step-threaded body of reflective geometry as right-hand threads 40 are turned in the clockwise direction when an axial force is applied in the direction of engagement 42. In the exemplary model of FIGS. 1 through 5, every one-seventh revolution of the external step-threaded body with respect to the internal step-threaded body will enable the external thread body to "step" through one thread pitch distance 44 in the axial direction of engagement to further advance it into the internal step-threaded body. In the exemplary model with seven thread/gap segments per revolution of the helical thread path, the total advancement per revolution of the external step-threaded body with respect to the internal step-threaded body is equal to seven times the thread pitch distance 44 plus one additional thread pitch distance to account for the rotational distance 46 that the thread segments of the external step-threaded body were in contact with the thread segments of the internal step-threaded body for one complete revolution.

Figure 16:
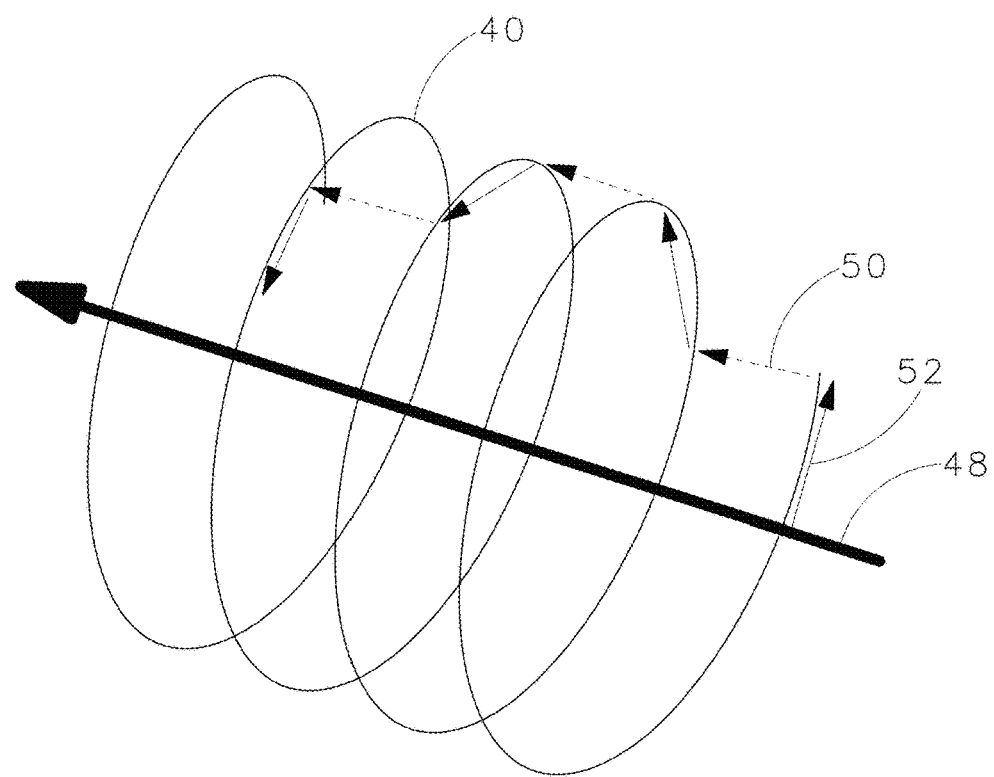
FIG. 16 is a diagrammatic view of the path that a point on an external step-threaded body would take through an internal step-threaded body as right-hand threads are turned in the counterclockwise direction when an axial force is applied in the direction of engagement.

FIG. 16 is a diagrammatic view of the path that a point on an external step-threaded body with a single-start thread form would take through an internal step-threaded body as right-hand threads 40 are turned in the counterclockwise direction when an axial force is applied in the direction of engagement 48. In the exemplary model, every one-seventh revolution of the external step-threaded body with respect to the internal step-threaded body will enable the external thread body to "step" through one thread pitch distance 50 in the axial direction of engagement to further advance it into the internal step-threaded body. In the exemplary model with seven thread/gap segments per revolution of the helical thread path, the total advancement per revolution of the external step-threaded body with respect to the internal step-threaded body is equal to seven times the thread pitch distance 50 minus one thread pitch distance to account for the rotational distance 52 that the thread segments of the external step-threaded body were in contact with the thread segments of the internal step-threaded body for one complete revolution.

Figure 17:
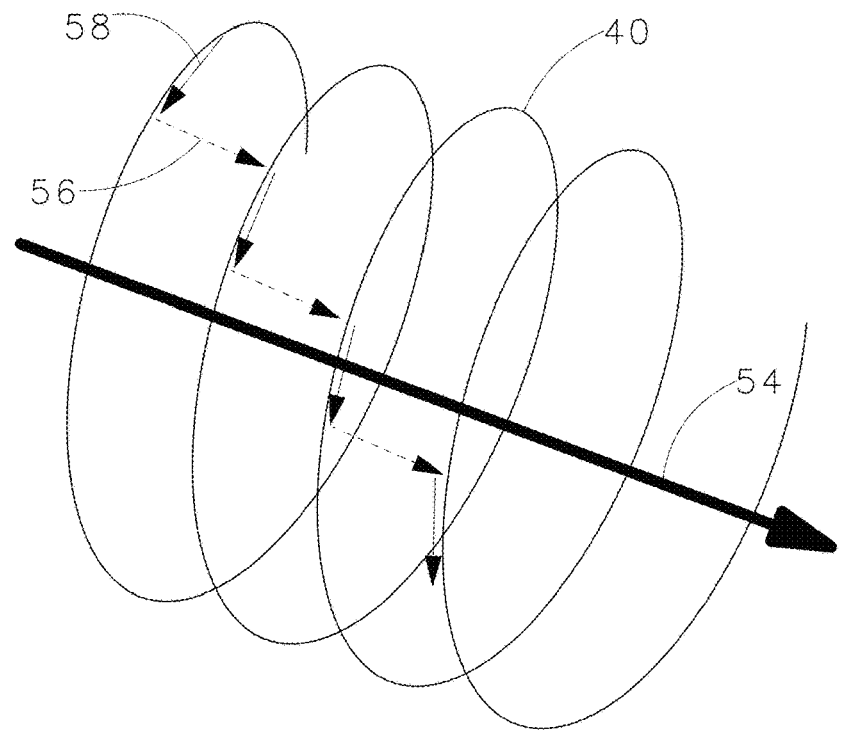
FIG. 17 is a diagrammatic view of the path that a point on an external step-threaded body would take through an internal step-threaded body as right-hand threads are turned in the counterclockwise direction when an axial force is applied in the direction of disengagement.

FIG. 17 is a diagrammatic view of the path that a point on an external step-threaded body with a single-start thread form would take through an internal step-threaded body as right-hand threads 40 are turned in the counterclockwise direction when an axial force is applied in the direction of disengagement 54. In the exemplary model, every one-seventh revolution of the external step-threaded body with respect to the internal step-threaded body will enable the external thread body to "step" through one thread pitch distance 56 in the axial direction of disengagement to further retract it from the internal step-threaded body. In the exemplary model with seven thread/gap segments per revolution of the helical thread path, the total retraction per revolution of the external step-threaded body with respect to the internal step-threaded body is equal to seven times the thread pitch distance 56 plus one additional thread pitch distance to account for the rotational distance 58 that the thread segments of the external step-threaded body were in contact with the thread segments of the internal step-threaded body for one complete revolution.

Figure 18:
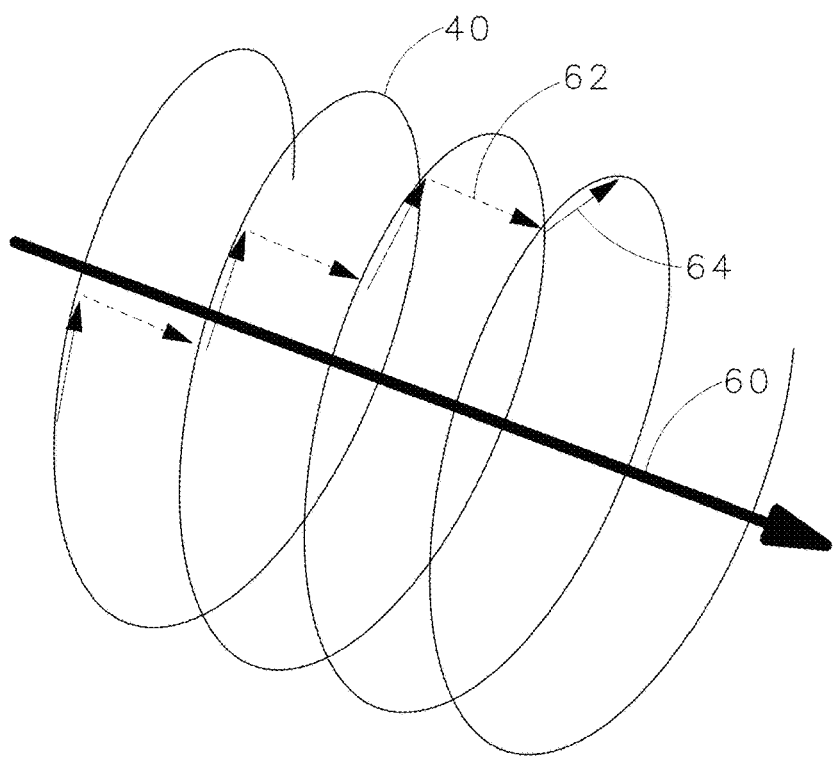
FIG. 18 is a diagrammatic view of the path that a point on an external step-threaded body would take through an internal step-threaded body as right-hand threads are turned in the clockwise direction when an axial force is applied in the direction of disengagement.

FIG. 18 is a diagrammatic view of the path that a point on an external step-threaded body with a single-start thread form would take through an internal step-threaded body as right-hand threads 40 are turned in the clockwise direction when an axial force is applied in the direction of disengagement 60. In the exemplary model, every one-seventh revolution of the external step-threaded body with respect to the internal step-threaded body will enable the external thread body to "step" through one thread pitch distance 62 in the axial direction of disengagement to further retract it from the internal step-threaded body. In the exemplary model with seven thread/gap segments per revolution of the helical thread path, the total retraction per revolution of the external step-threaded body with respect to the internal step-threaded body is equal to seven times the thread pitch distance 62 minus one thread pitch distance to account for the rotational distance 64 that the thread segments of the external step-threaded body were in contact with the thread segments of the internal step-threaded body for one complete revolution.

Figure 19:
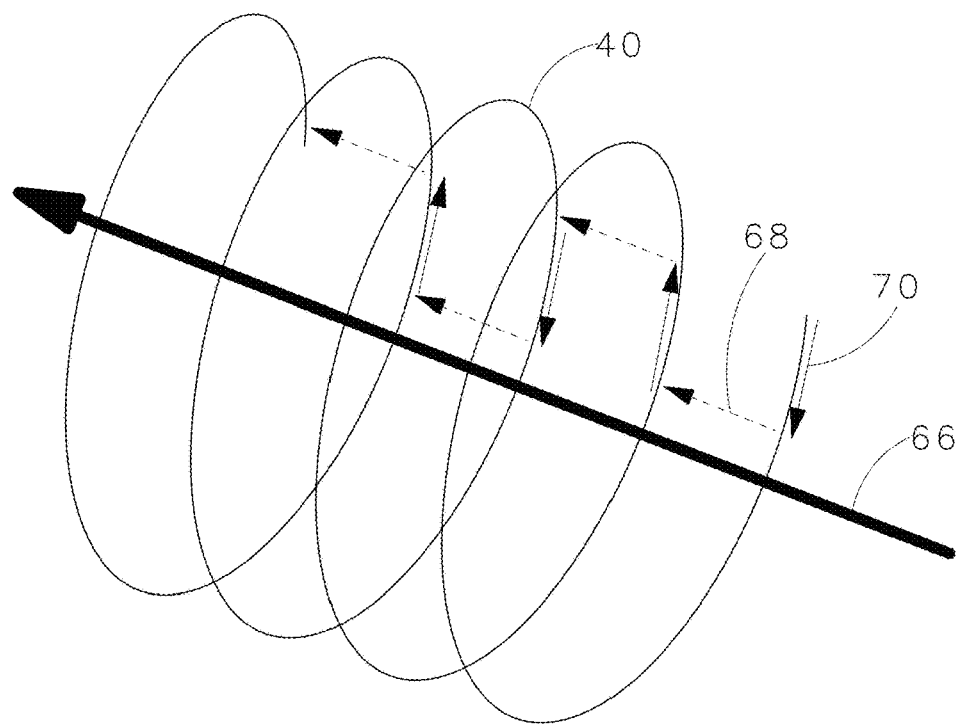
FIG. 19 is a diagrammatic view of the path that a point on an external step-threaded body would take through an internal step-threaded body as right-hand threads are turned alternately in both the clockwise and counterclockwise directions when an axial force is applied in the direction of engagement.

FIG. 19 is a diagrammatic view of the path that a point on an external step-threaded body with a single-start thread form would take through an internal step-threaded body as right-hand threads 40 are turned alternately in the clockwise and counterclockwise directions following each "step" event when an axial force is applied in the direction of engagement 66. In the exemplary model, every one-seventh revolution of the external step-threaded body with respect to the internal step-threaded body will enable the external thread body to "step" through one thread pitch distance 68 in the axial direction of engagement to advance the external step-threaded body into the internal step-threaded body. This would be immediately followed by a reversal of rotation to approach the next step event in the axial direction of travel.

Such a feature may be desirable in an application where one would want to advance a bolt into a fixed nut or other stationary internally-threaded receptacle without having to reposition one's fingers on the bolt head with every partial turn to advance the bolt all the way home to its assembled position. In the exemplary model with seven thread/gap segments per revolution of the helical thread path, the step-wise lead achieved in the axial direction per every one-seventh revolution 70 of the external step-thread body with respect to the internal step-threaded body is equal to one thread pitch distance 68 so that the total distance of axial advancement per one equivalent revolution of the external step-threaded body with respect to the internal step-threaded body is equal to seven times the thread pitch distance 68. In this method of assembly, the additional rise or additional fall that the thread segments of the step-threaded bodies would have contributed to the total axial travel of the external step-threaded body with respect to the internal step-threaded body, made by virtue of the intermittent contact of the thread segments in both thread bodies, are cancelled out via the alternating directions of turning the external step-threaded body with respect to the internal step-threaded body at each step event.

Figure 20:
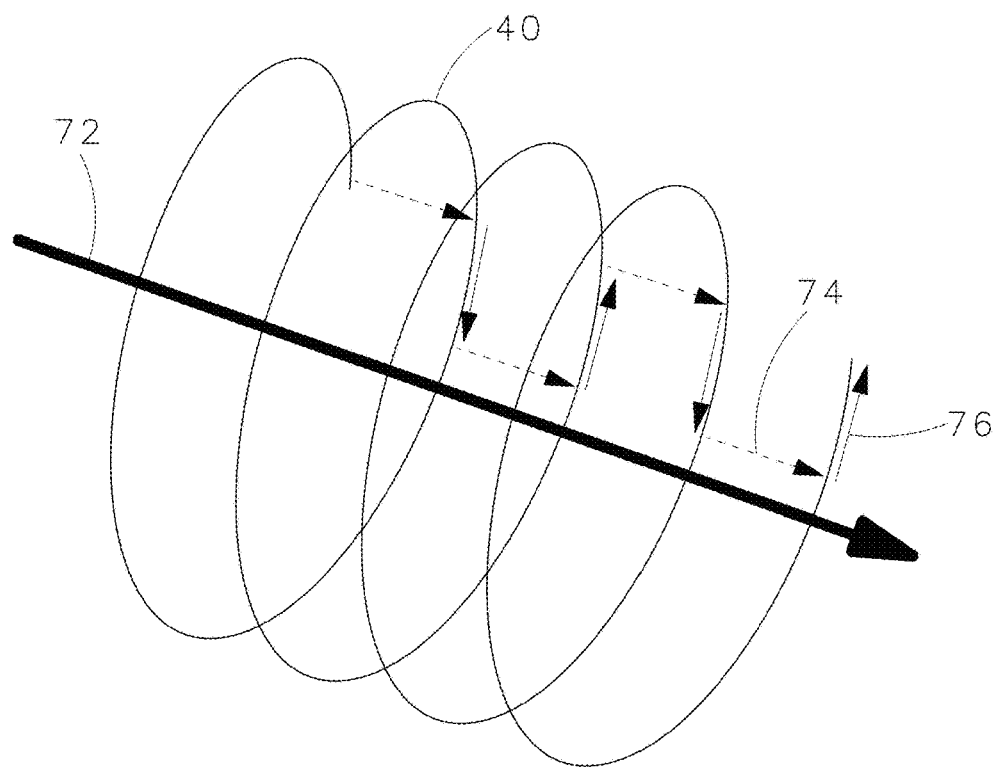
FIG. 20 is a diagrammatic view of the path that a point on an external step-threaded body would take through an internal step-threaded body as right-hand threads are turned alternately in both the clockwise and counterclockwise directions when an axial force is applied in the direction of disengagement.

FIG. 20 is a diagrammatic view of the path that a point on an external step-threaded body with a single-start thread form would take through an internal step-threaded body as right-hand threads 40 are turned in the clockwise and counterclockwise directions, alternately, following each "step" event when an axial force is applied in the direction of disengagement 72. In the exemplary model, every one-seventh revolution of the external step-threaded body with respect to the internal step-threaded body will enable the external thread body to "step" through one thread pitch distance 74 in the axial direction of disengagement to further retract the external step-threaded body from the internal step-threaded body. This would be immediately be followed by a reversal of rotation to approach the next step event in the axial direction of travel. Such a feature may be desirable in an application where one would want to remove a bolt from a fixed nut or other stationary internally-threaded receptacle without having to reposition one's fingers on the bolt head with every partial turn to remove the bolt from its internally-threaded receptacle. In the exemplary model, with seven thread/gap segments per revolution of the helical thread path, the step-wise advancement achieved in the axial direction per every one-seventh revolution 76 of the external step-thread body with respect to the internal step-threaded body is equal to one thread pitch distance 74 so that the total distance of axial advancement per one equivalent revolution of the external step-threaded body rotation with respect to the internal step-threaded body is equal to seven times the thread pitch distance 74. In this method of assembly, the additional rise or additional fall that the thread segments of the step-threaded bodies would have contributed to the total axial travel of the external step-threaded body with respect to the internal step-threaded body, made by virtue of the intermittent contact of the thread segments in both thread bodies, are cancelled out via the alternating directions of turning the external step-threaded body with respect to the internal step-threaded body at each step event.

Figure 21:
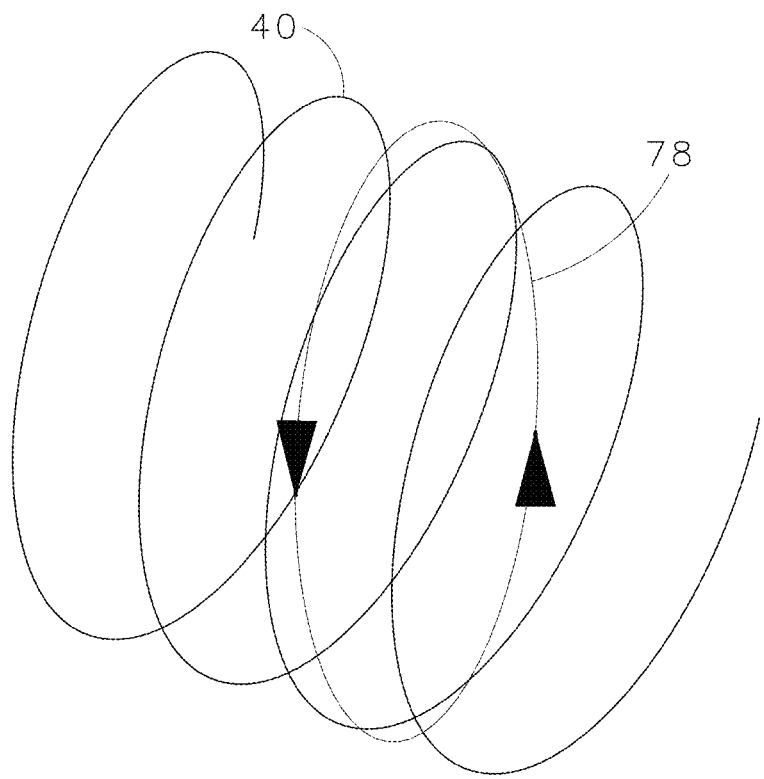
FIG. 21 is a diagrammatic view of the circular path that a point on an external step-threaded body would take inside an internal step-threaded body as right-hand threads are turned in either the clockwise or counterclockwise direction when no net axial force is applied on either threaded body.
Figure 22:
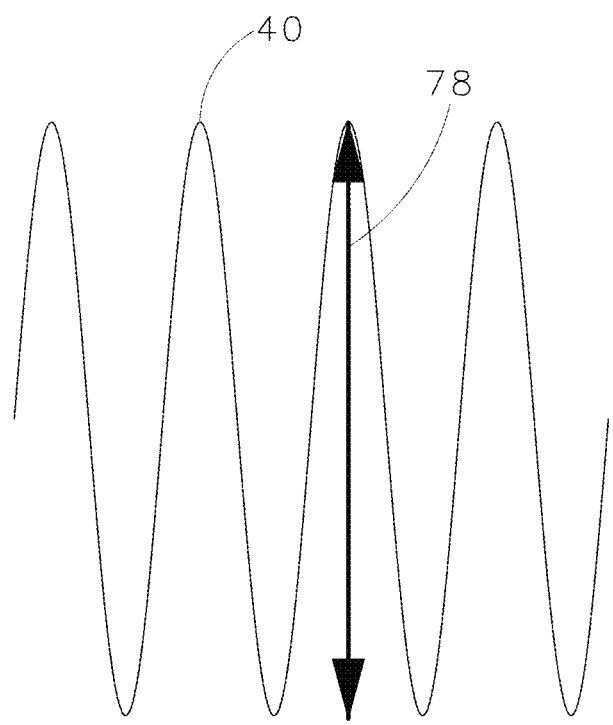
FIG. 22 is a plan view of the diagrammatic view of FIG. 21 in which the circular path is represented as vertical arrow lines perpendicular to the axial direction of the internal thread path.

FIG. 21 is a diagrammatic view of the path that a point on an external step-threaded body with a single-start thread form would take within an internal step-threaded body as right-hand threads 40 are turned in the clockwise 78 or counterclockwise 80 directions when no net axial force is acting on either the external step-threaded body or the internal step-threaded body. In this case, if an external step-threaded body is rotated in either the clockwise or counterclockwise directions, or both directions alternately, with no net axial force acting upon the external or internal step-threaded bodies, the external step-threaded body will simply just spin in place inside the internal step-threaded body without advancing axially in either direction. FIG. 22 is a plan view of FIG. 21 in a direction perpendicular to the axis of the thread body which more clearly illustrates how an external step-threaded body will not advance or retract within an internal step-threaded body when no net axial force is acting on either body.

It is noted at this point that the kinematics of the interaction between an external step-threaded body with an internal step-threaded body as heretofore defined by the thread path diagrams illustrated in FIGS. 15 through 22 were verified with 3D printed models.

Figure 25:
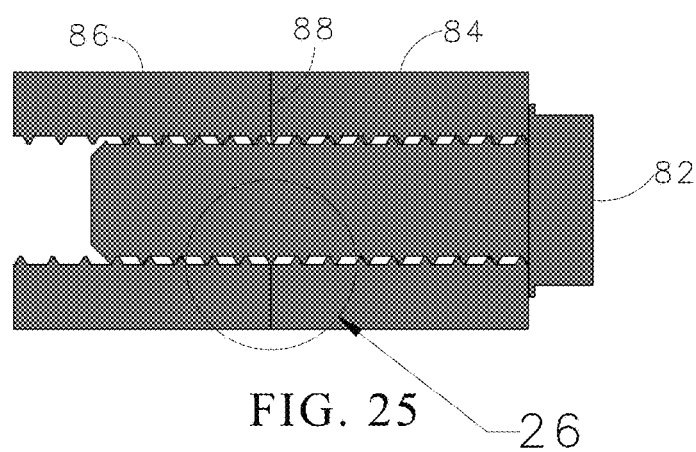
FIG. 25 is a plan view of a thin cross section taken from FIG. 23 along the section line to aid in the clarity of viewing the engagement of the threads of the external step-threaded body through the threads of two internal step-threaded bodies.
Figure 26:
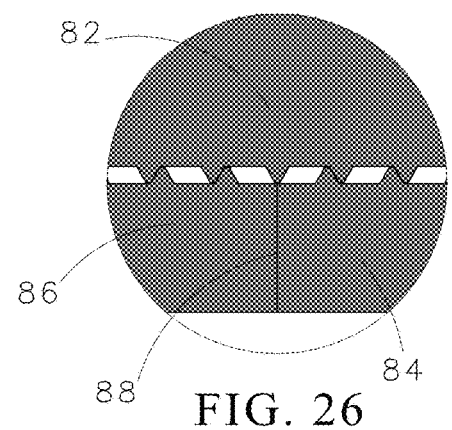
FIG. 26 is a partial view of FIG. 25 magnifying the geometry of thread engagement between an external step-threaded body and two internal step-threaded bodies when a second internal step-threaded body is rotated by an arc length of one thread segment with respect to a first internal step-threaded body to enable the continuous threading mode.
Figure 24:
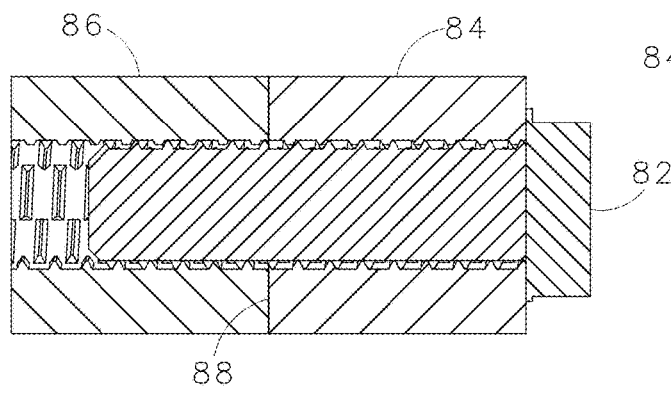
FIG. 24 is a section view of FIG. 23.
Figure 23:
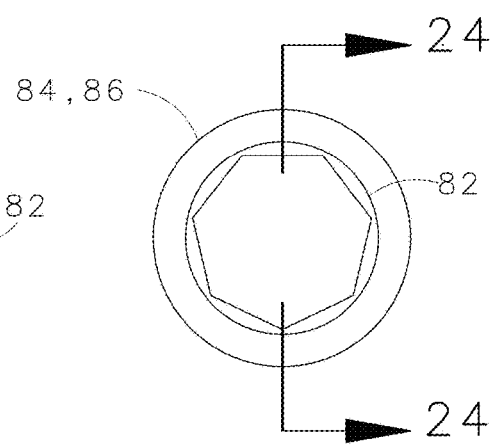
FIG. 23 is a plan view of the end, or axial, view of a step-thread component assembly consisting of one external step-threaded body and two contiguous internal step-threaded bodies.

We will now address the unique mechanical features available with a step-threaded assembly that includes one external step-threaded body functioning with two internal step-threaded bodies. To begin the discussion, FIG. 23 is a plan view in the axial direction of an external step-threaded body 82 engaged with two contiguous internal step thread bodies 84 and 86. The two contiguous internal step-threaded bodies 84 and 86 are constrained translationally at their mutually-shared plane interface 88 illustrated in FIG. 24 but are free to rotate with respect to one other. FIG. 24 is a section view taken from FIG. 23 in which two contiguous internal step-threaded bodies 84 and 86 are rotationally offset from one another by an angle congruent with the arc distance of one thread segment. While the result of this rotational offset may not be readily discernable in FIG. 24, the shaded sectional views in FIGS. 25 and 26 more clearly reveal that the step thread segments in the left-hand internal step-threaded body 86 have been offset axially with respect to the step thread segments in the right-hand internal step-threaded body 84 by a distance of one thread pitch. This was achieved by rotating the left-hand internal step-threaded body 86 clockwise, as viewed from the right, by an arc distance of one thread segment. In this configuration, the step function is deactivated for the assembly, and a continuous threading mode is enabled for the external step-threaded body as it is passes through both internal step-threaded bodies. This rotational offset induced between the internal step-threaded bodies has the effect of confining the external body thread segments to a continuous helical thread path during its rotation through both internal step-threaded bodies. FIG. 26 provides better clarity as to how the continuous threading functionality is enabled, as it can be seen that the thread segment faces of the external step-threaded body 82 are in contact with the thread segment faces on the right-hand side of the internal step-threaded body 84 while the thread segment faces of the externally-threaded body 82 are in contact with the thread segment faces on the opposite, or left-hand side of the internal step-threaded body 86 as the external step-threaded body it passes through both internal step-threaded bodies. In effect, this configuration constrains the thread segments in the external body from engaging the gaps in the internal bodies which enables a continuous uninterrupted threading of the external thread body through both internal thread bodies at a lead equal to the pitch distance of the thread form with no interruptions in rotational motion as a net axial force in applied to either body.

Figure 28:
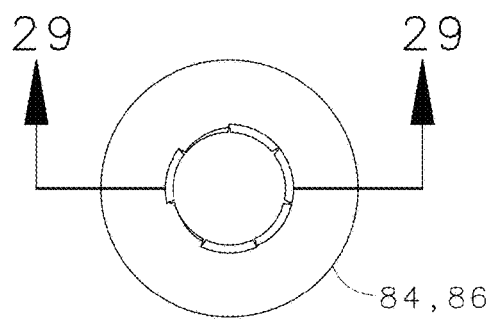
FIG. 28 is a plan view of two contiguous internal step-threaded bodies as viewed in the axial direction.
Figure 27:
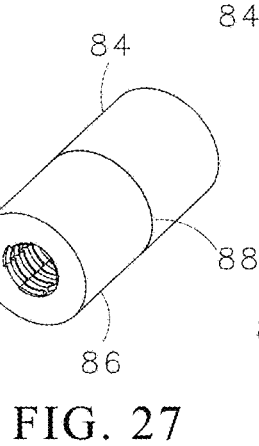
FIG. 27 is a perspective view of two contiguous internal step-threaded bodies.
Figure 31:
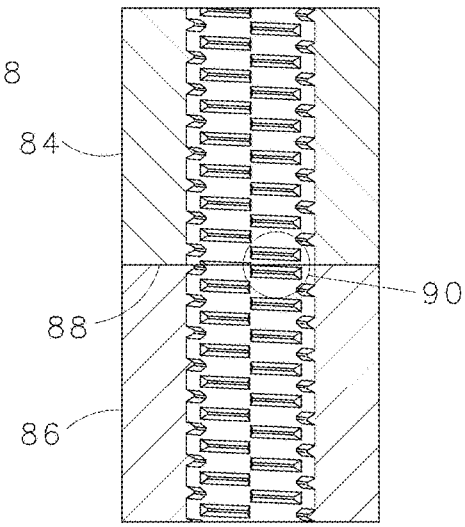
FIG. 31 is a section view of FIG. 30 which illustrates two contiguous internal step-threaded bodies that are rotationally-offset with respect to one another by one thread segment of arc length so that the step-wise lead feature is disabled and the continuous threading mode is enabled.

As a continuation of the discussion of the unique mechanical features attained via a step-threaded fastener assembly which includes an external step-threaded body and two internal step-threaded bodies, we now turn to FIGS. 27 through 31. FIG. 27 is a perspective view of two contiguous internal step-threaded bodies 84 and 86 which are constrained axially at their mutual interface plane 88. FIG. 28 is an axial view of the two internal step-threaded bodies 84 and 86 which are rotationally aligned with respect to each other to enable the step feature. Note in the section view FIG. 29 that the step threads for the contiguous internal step-threaded bodies 84 and 86 are arranged in a uniform pattern across their plane interface 88 such that the thread segments between the internal step-threaded bodies maintain the same repeating pattern, without alteration, as the transition is made from one internal step-threaded body to the next across the plane interface 88.

Figure 30:
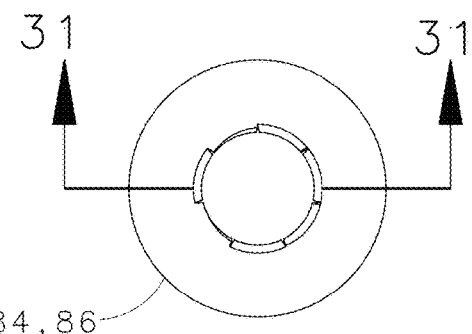
FIG. 30 is a plan view of two contiguous internal step-threaded bodies as viewed in the axial direction.
Figure 29:
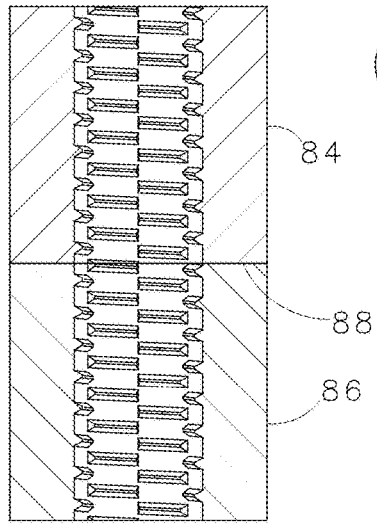
FIG. 29 is a section view of FIG. 28 which illustrates two contiguous internal step-threaded bodies aligned such that the step-wise lead feature is enabled through both the bodies.

FIG. 30 is an axial view of the two internal step-threaded bodies 84 and 86 which are rotationally offset from one another to disable the step feature and to enable a continuous threading mode of an external step-threaded body though the two contiguous internal step-threaded bodies. Note in the section view FIG. 31 that the step thread segments across the plane interface 88 between the contiguous internal step-threaded bodies 84 and 86 do not lie in a uniform pattern across the plane interface 88 but instead are offset in the axial direction so that two step thread segments 90 are positioned within one thread pitch of axial distance from each other, thereby enabling a constraint of the external thread segments to an continuous uninterrupted thread path with the step function disabled.

It is noted at this point that the kinematics of the interaction between an external step-threaded body with two contiguous internal step-threaded bodies as heretofore defined in FIGS. 23 through 31 were verified with 3D printed models.

Figure 34:
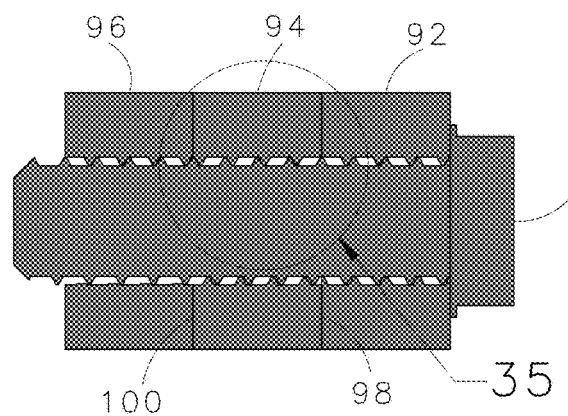
FIG. 34 is a plan view of a thin cross section taken from FIG. 32 along the section line to aid in the clarity of viewing the engagement of the threads of the external step-threaded body through the threads of three internal step-threaded bodies.
Figure 35:
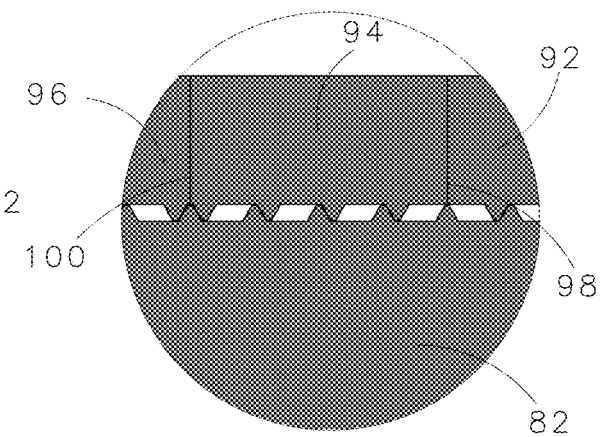
FIG. 35 is a partial view magnifying the geometry of thread engagement between an external step-threaded body and three internal step-threaded bodies when a second internal step-threaded body is rotated by an arc length of one thread segment with respect to a first internal step-threaded body and a third internal step-threaded body is rotated by an arc length of one thread segment with respect to a second internal step-threaded body to enable the continuous threading mode.
Figure 33:
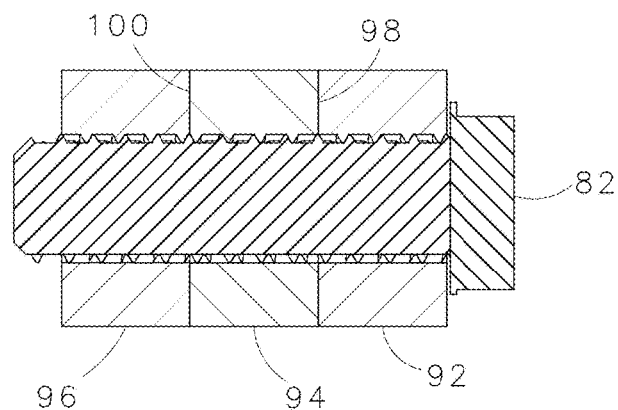
FIG. 33 is a section view of FIG. 32.
Figure 32:
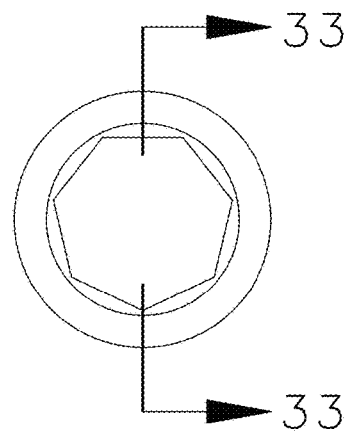
FIG. 32 is a plan view of the end, or axial, view of a step-thread component assembly consisting on one external step-threaded body and three contiguous internal step-threaded bodies.

We will now consider the mechanical advantages of a step-threaded assembly that includes one external step-threaded body and three contiguous internal step-threaded bodies. To begin this discussion, FIG. 32 is a plan view in the axial direction of an external step-threaded body 82 engaged with three contiguous internal step thread bodies 92, 94 and 96. The three contiguous internal step thread bodies 92, 94 and 96 are constrained translationally at their plane interfaces 98 and 100 as illustrated in FIG. 33 but are free to rotate with respect to one other. FIG. 33 is a section view taken from FIG. 32 in which three contiguous internal step-threaded bodies 92, 94 and 96 are rotationally offset from each another by an angle congruent with the arc distance of one thread segment. While the result of this rotational offset may not be readily discernable in FIG. 33, the shaded sectional views in FIGS. 34 and 35 more clearly reveal that the step thread segments in the center step-threaded body 94 have been offset axially with respect to the step thread segments in the right-most internal step-threaded body 92 by the distance of one thread pitch. This was achieved by rotating the center internal step-threaded body 94 clockwise, as viewed from the right, by an the arc distance of one thread segment with respect to the right-most internal step-threaded body 92. Further, the step thread segments in the left-most internal step-threaded body 96 have been offset axially with respect to the step thread segments in the center internal step-threaded body 94 by the distance of one thread pitch. This was achieved by rotating the left-most internal step-threaded body 96 clockwise, as viewed from the right, by an arc distance of one thread segment with respect to the center internal step-threaded body 94. In this configuration, the step function is deactivated for the entire assembly, and a continuous threading mode is enabled for the external step-threaded body as it is passes through all three internal step-threaded bodies simultaneously. The rotational offset conditions induced between all three internal step-threaded bodies has the effect of confining the thread segments of the externally-threaded body to a continuous helical thread path during its rotation through all three internal step-threaded bodies. FIG. 35 provides better clarity as to how the continuous uninterrupted threading functionality is enabled, as it can be seen that the thread segment faces of the external step-threaded body 82 are in contact with the thread segment faces on the right-hand side of the thread segments inside the right-most internal step-threaded body 92; and that the thread segment faces of the external step-threaded body 82 are in contact with the thread segment faces on the left-hand side of the thread segments inside the center internal step-threaded body 94; and finally, that the thread segment faces of the external step-threaded body 82 are once again in contact with the thread segment faces on the right-hand side of the thread segments inside the left-most internal step-threaded body 96 as they were for the right-most internal step-threaded body 92. In effect, this condition constrains the thread segments in the external body from engaging the gaps in the three internal step-threaded bodies to enable a continuous uninterrupted threading of the external thread body through all three internal thread bodies at a lead equal to the pitch distance of the thread form with no interruptions in the helical path of the thread form as a net axial force is applied in the desired direction of travel.

Figure 37:
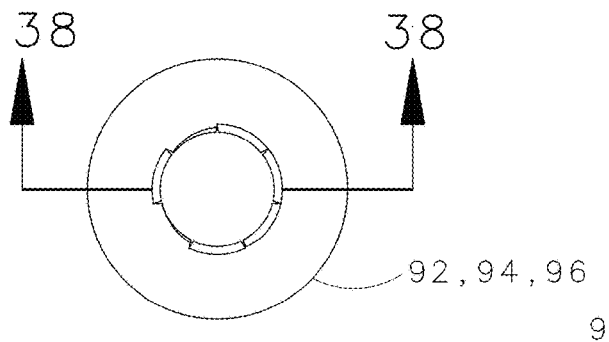
FIG. 37 is a plan view of three contiguous internal step-threaded bodies as viewed in the axial direction.
Figure 36:
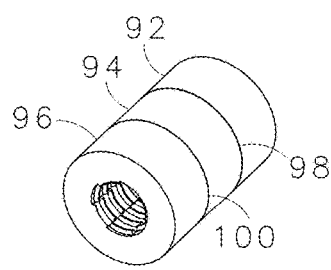
FIG. 36 is a perspective view of three contiguous internal step-threaded bodies.
Figure 38:
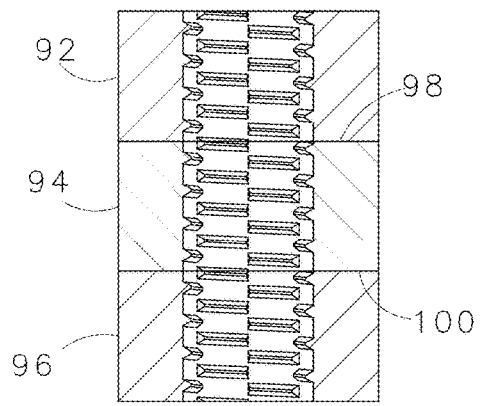
FIG. 38 is a section view of FIG. 37 which illustrates three contiguous internal step-threaded bodies aligned such that the step-wise lead feature is enabled through all three bodies.
Figure 40:
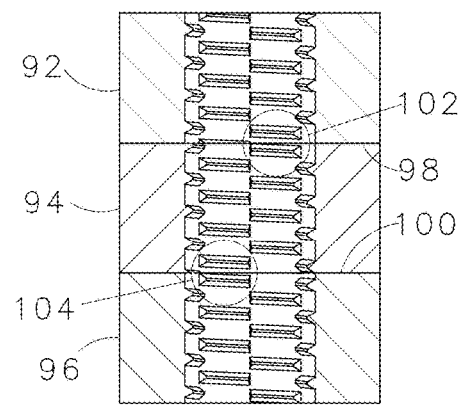
FIG. 40 is a section view of FIG. 39 which illustrates three contiguous internal step-threaded bodies that are rotationally-offset with respect to one another by one thread segment of arc length so that the step-wise lead feature is disabled and the continuous threading mode is enabled.

As a continuation of the discussion of the unique mechanical features attained via a step-threaded fastener assembly which includes three internal step-threaded bodies, we now turn to FIGS. 36 through 40. FIG. 36 is a perspective view of three contiguous internal step-threaded bodies 92, 94 and 96 which are constrained axially at their mutual plane interfaces 98 and 100. FIG. 37 is an axial view of the three internal step-threaded bodies 92, 94 and 96 which are rotationally aligned with each other to enable the step-wise advance feature. Note in the section view FIG. 38 that the step thread segments in the three contiguous internal step-threaded bodies 92, 94 and 96 lie in a uniform pattern across their plane interfaces 98 and 100 such that the thread segments between the internal step-threaded bodies maintain the same repeating pattern, without alteration, as the transition is made from one internal step-threaded body to the next across the plane interfaces 98 and 100.

Figure 39:
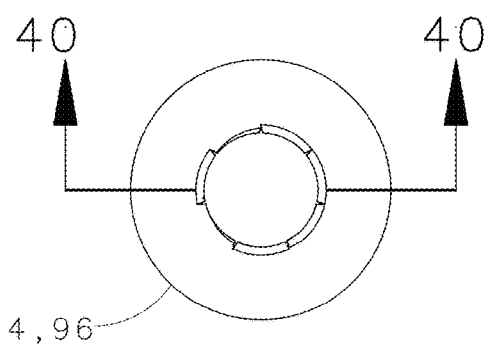
FIG. 39 is a plan view of three contiguous internal step-threaded bodies as viewed in the axial direction.

FIG. 39 is an axial view of the three internal step-threaded bodies 92, 94 and 96 which are rotationally offset from each another to disable the step feature and to enable a continuous uninterrupted threading mode of an external step-threaded body 82 though all three contiguous internal step-threaded bodies 92, 94 and 96. Note in the section view FIG. 40 that the step thread segments across the plane interfaces 98 and 100 established between the internal step-threaded bodies 92, 94 and 96 do not lie in a uniform pattern across the plane interfaces but instead are offset in the axial direction so that two step thread segments 102 are positioned within one thread pitch of distance from each other on each side of the interface line 98, and that another two step thread segments 104 have been positioned within one thread pitch distance of each other on each side of the interface line 100, thereby enabling a constraint of the external thread segments to a continuous uninterrupted thread path with the step function disabled.

Figure 41:
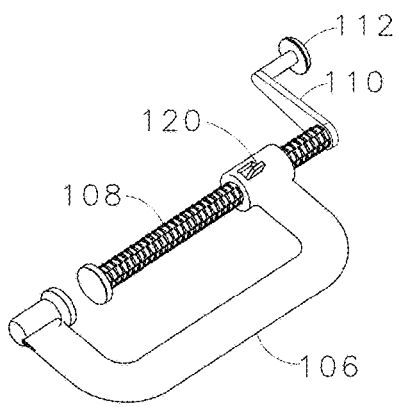
FIG. 41 is a plan view of a c-clamp which utilizes step-thread geometry to achieve the dual features of rapid advancement of a c-clamp threaded rod via the step-wise lead feature to set the approximate clamp gap desired followed by a simple adjustment to enable a continuous threading mode for clamping objects.
Figure 42:
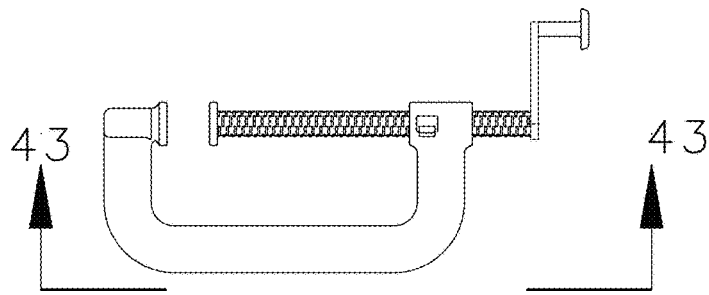
FIG. 42 is a plan view of the c-clamp of FIG. 41.
Figure 43:
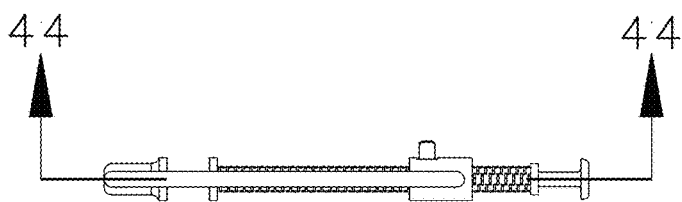
FIG. 43 a plan view of the c-clamp of FIG. 41 in a direction orthogonal to FIG. 42.
Figure 45:
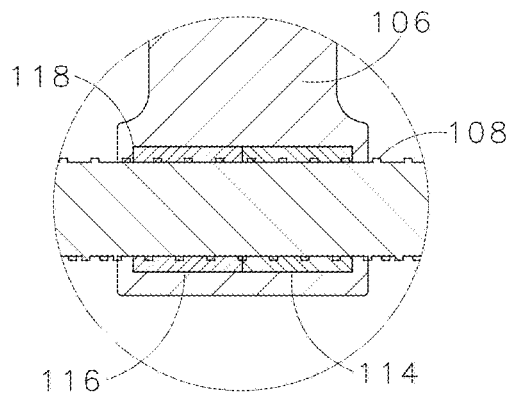
FIG. 45 is a partial view of FIG. 44 which magnifies the c-clamp step-thread mechanism consisting of an external step-threaded clamp rod and two contiguous internal step-threaded couplings.
Figure 44:
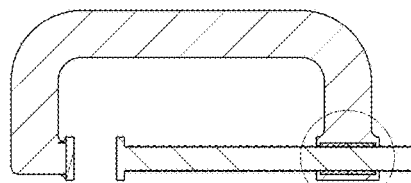
FIG. 44 is a section view of the c-clamp in FIG. 43.

We will now consider an application of the step thread assembly configuration consisting of one external step-threaded body and two internal step-threaded bodies as previously described in FIGS. 23 through 31. FIG. 41 is a prospective view of a c-clamp which utilizes step thread geometry to enable both a rapid positioning mode and a continuous threading mode of a clamping mechanism. In FIG. 41, the exemplary c-clamp model consists of a frame 106, a step-threaded clamping rod 108, a crank 110 permanently affixed to the clamping rod 108, a handle 112 for rotating and applying an axial force to the clamping rod 108, and a latch 120 for switching the threading modes of the c-clamp. FIGS. 42 and 43 are plan views used to generate the section view FIG. 44. The partial view FIG. 45, taken from the section view FIG. 44, illustrates the c-clamp frame with two contiguous internal step-threaded couplings that are axially aligned but are translationally constrained at their shared plane interface within a cavity 118 that may be machined or cast into the c-clamp body. The right-hand coupling 114 of FIG. 45 is translationally and rotationally fixed within the frame 106 of the c-clamp, while the left-hand coupling 116 is allowed to rotate a discrete angular distance congruent with the arc length of one thread segment to enable either the step-wise advance mode or the continuous threading mode of the c-clamp rod 108 within the frame 106. Using two contiguous internal step-threaded couplings 114 and 116, the second internal step-threaded coupling 116 is rotationally aligned with respect to the first internal step-threaded coupling 114 as defined in FIG. 29 to enable the step-wise advance mode of the c-clamp rod to quickly set the approximate spacing of the c-clamp around the objects being clamped. Then, to enable the continuous uninterrupted threading of the c-clamp rod at the thread pitch lead for clamping the objects, the second internal step-threaded coupling 116 is quickly and easily rotated by an angle congruent with the distance of one thread segment arc with respect to the first internal step-threaded coupling to activate the continuous uninterrupted threading mode of the c-clamp screw to clamp the objects.

From FIG. 41, it is discerned that a second internal step-threaded coupling 116 can quickly be indexed with respect to a first internal thread coupling 114 with just the flip of a latch 120 that is connected to a second internal thread segment 116 to enable either the step-wise lead mode or the continuous threading mode of the c-clamp. For the exemplary case of seven thread/gap segments per revolution of the helical thread path of the clamping rod 108, the amount of rotation required of a second step-threaded coupling 116 with respect to a first coupling 114 to convert from the step-wise lead mode to the continuous threading mode, or vice-versa, is one-seventh of one revolution, or approximately 51.429 degrees. This can be accomplished quickly with the thumb of the hand that is holding the c-clamp body 106 as the screw cranking mechanism consisting of components 110 and 112 is rotated by the other hand to clamp or unclamp the objects. To clamp objects, latch 120 can be set to the step-wise lead mode for the c-clamp so that the clamping rod can be advanced up quickly to the objects being clamped, at which point the latch 120 can be switched to the continuous threading mode for performing the clamping function. When it is desired to unclamp the objects, the clamping force can be released while the c-clamp is still in the continuous threading mode after which the latch 120 can be flipped back to its alternate position so that the step-wise lead mode is once again activated for the quick retraction of the clamping rod and the removal of the c-clamp from the objects being clamped.

FIG. 46 is an exploded view of the two contiguous internal step-threaded couplings 114 and 116 of the c-clamp assembly of FIG. 41 which include features 126 and 128 for controlling the rotational alignment and offset of the internal step-threaded couplings 114 and 116 with respect to one another. When the coupling end faces 122 and 124 are in contact at their interface plane within the frame cavity 118, button 126 will engage the slot 128 to enable a range of relative rotation equal to the arc length of one thread segment as defined by the arc length of the slot. As such, the range of rotation of the first coupling with respect to the second coupling is determined by the arc length of the slot 128 in coupling 116. This range of relative rotation of one coupling with respect to the other, enabled by features 126 and 128, will enable the step-wise lead mode at one end of the range of relative rotation of one coupling with respect to the other and the continuous threading mode at the other end of the range of relative rotation. It should be noted at this point that three or more internal step-threaded couplings could also be implemented in the exemplary c-clamp device without any loss of functionality described herein. In such a design, every subsequent internal step-threaded coupling added to the stack could be rotationally offset from the previous coupling in the stack by an angular distance congruent with the arc length of one thread segment to increase the clamping strength of the c-clamp. The net effect here would be that the faces of the external step threads on the clamping rod 108 would contact alternating sides of the thread segments inside the internal step-threaded couplings as the clamping rod passes from one internal step-threaded coupling to the next.

Figure 49:
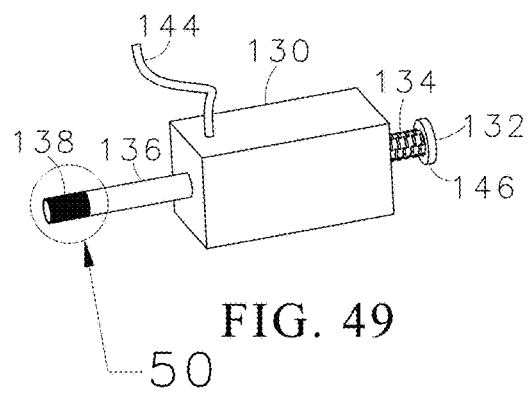
FIG. 49 is a perspective view of a hydro-mechanical or pneumatic positioning mechanism which includes step-thread components to achieve various combinations of controlled linear and rotational step displacements.
Figure 51:
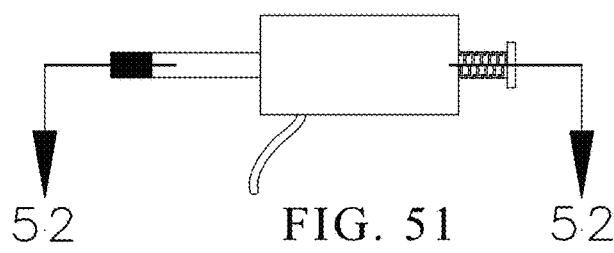
FIG. 51 is a plan view of the positioning mechanism of FIG. 49.
Figure 53:
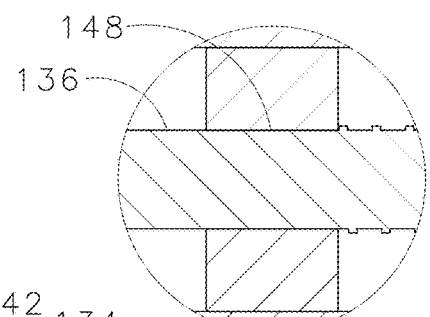
FIG. 53 is a partial view of a piston affixed to the shaft of the positioning mechanism illustrated in the section view FIG. 52.
Figure 52:
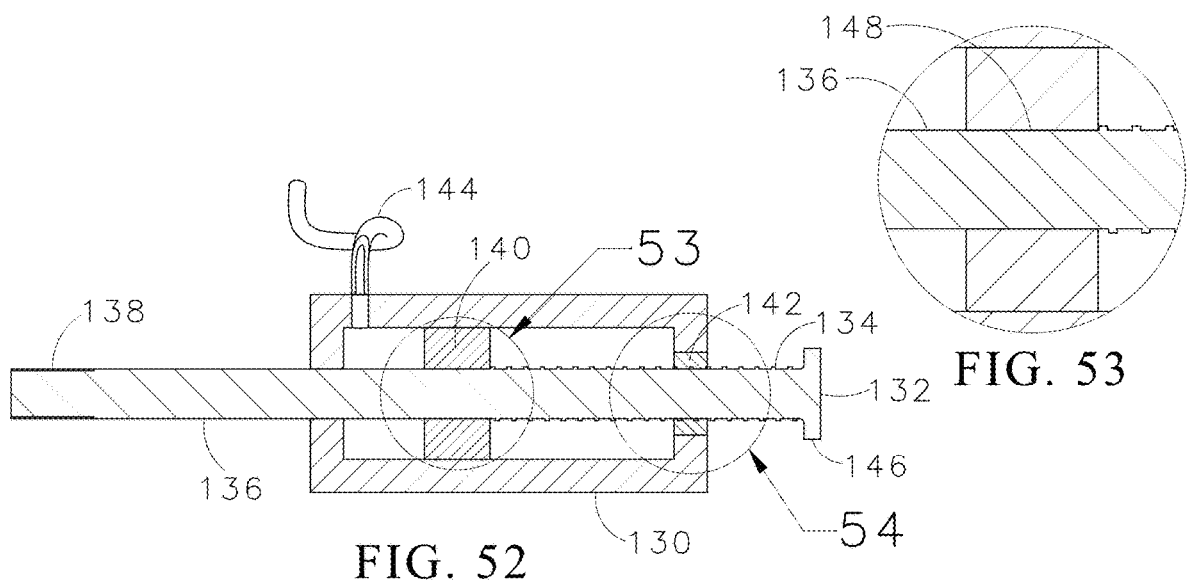
FIG. 52 is a section view of the positioning mechanism of FIG. 51.

We will now consider another application for a step thread assembly configuration consisting of an external step-threaded body and an internal step-threaded body as previously defined. FIG. 49 is a perspective view of a hydro-mechanical or pneumatic positioning device which would enable either a controlled linear step displacement or a combination of controlled linear and rotational step displacements. FIG. 51 is a plan view of the device from which the section view of FIG. 52 was taken. We will now turn our attention to the section view of FIG. 52 where the positioning device includes a body 130; a shaft 132 that includes components 134, 136, 138 and 146; a piston 140 that is translationally and rotationally fixed to the shaft 132; a shaft bearing 142 that includes step threads in its internal diameter; and a hydraulic or pneumatic hose 144 that routes pressurized fluid into and out of the compartment space on the left-hand side of piston 140 inside body 130. FIG. 53 is a partial view of the shaft-piston connection interface 148 with the shaft-piston assembly slidably disposed within the bore inside body 130. It is noted here that the piston 140 is affixed to the shaft 132 such that the piston 140 is constrained in all degrees of freedom with respect to the shaft 132. However, the piston-shaft assembly itself is slidably disposed within the bore of the body 130 so that the piston-shaft assembly can travel along the axis of the housing bore with the additional ability to rotate within the housing bore.

Figure 50:
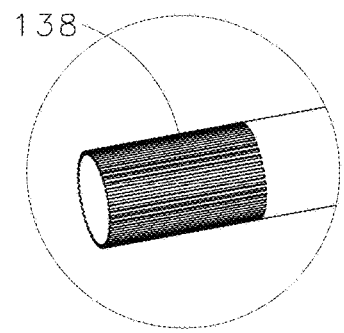
FIG. 50 is a partial view of a splined end of the shaft of the positioning mechanism of FIG. 48.
Figure 54:
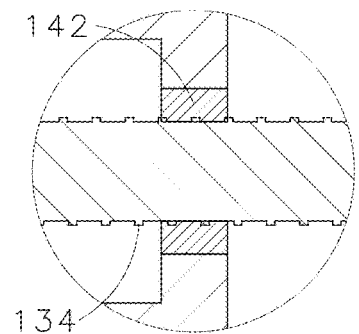
FIG. 54 is a partial view of the engagement of an external step-threaded shaft of the positioning mechanism of FIG. 49 with an internal step-threaded coupling.

FIG. 50 is a partial view of the splined end 138 of shaft 132 which enables the shaft 132 to be driven rotationally by a motor (not shown) while allowing the piston-shaft assembly to travel axially within the housing bore. If shaft 132 is rotated with no pressurized fluid applied to the housing compartment to which hose 144 is routed, the shaft will merely spin in place as is illustrated in FIGS. 21 and 22 with no axial advancement of the piston-shaft assembly within the housing bore. However, as pressurized fluid is applied to the housing compartment to which hose 144 is connected, the piston-shaft assembly will begin to advance axially within the housing bore in a step-wise fashion to the right according to the view in FIG. 52. This is made possible by the engagement of the step-threaded portion 134 of shaft 132 with the internal step threads of coupling 142 as illustrated in FIG. 54. Similarly, as fluid is withdrawn from the housing compartment to which hose 144 is connected, shaft 132 will begin to retract axially into the housing bore in a step-wise fashion to the left according to the view in FIG. 52. Whether an object attached to the end of shaft 132 will translate in a step-wise fashion only or will rotate and translate in a step-wise fashion will depend on the freedom that connector 146 has to rotate at the end of shaft 132. Finally, FIG. 54 is a partial view of the step-threaded portion 134 of shaft 132 that is engaged with the internal step threads of coupling 142.

Figure 55:
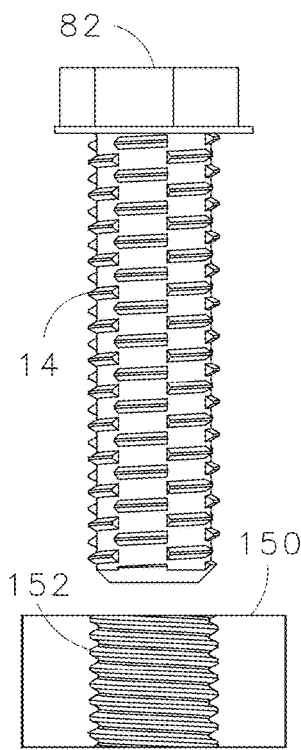
FIG. 55 is a plan view of an external step-threaded bolt engaging an internal thread body with continuous threads.
Figure 56:
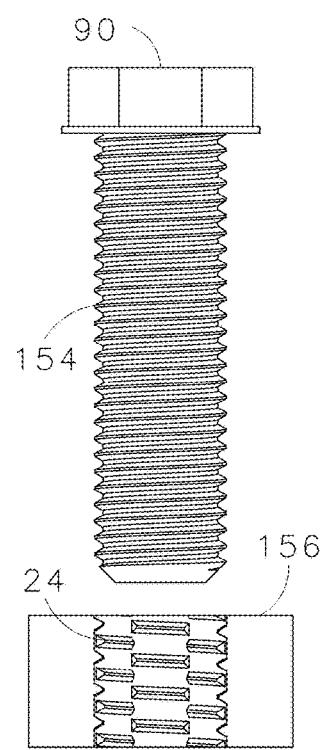
FIG. 56 is a plan view of a continuously-threaded bolt engaging an internal step-threaded body.

An external step-threaded body can also be combined with a continuously-threaded internal thread body, or a continuously-threaded external thread body may be combined with an internal step-threaded body, to reduce the amount of net axial force that would be required to strip the one thread body from the other in the axial direction. Please see FIGS. 55 and 56 that represent these configurations, respectively. Such applications might include street and highway signs which are hinged at joints that are designed to fail during excessive winds to allow the sign to swing away from the direct path of the wind to prevent damage from occurring to either the sign or the post to which it attaches. An external step-threaded bolt coupled with a continuously-threaded nut as illustrated in FIG. 55, or vice versa as illustrated in FIG. 56, oriented in the proper direction would allow the hinged joint to fail at approximately 50% of the stripping strength of a conventional continuously-threaded bolt and nut which could prevent damage to the sign structure and allow for reinstallation of the failed fasteners to restore the sign to its original position.

Figure 57:
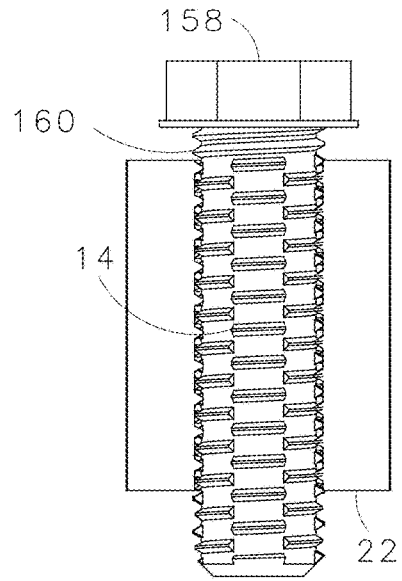
FIG. 57 is a plan view of an hybrid bolt consisting of a step threads for the major part of the bolt shank length with a continuous thread or so just under the bolt head and an internal step-threaded body with which it is intended to engage.
Figure 58:
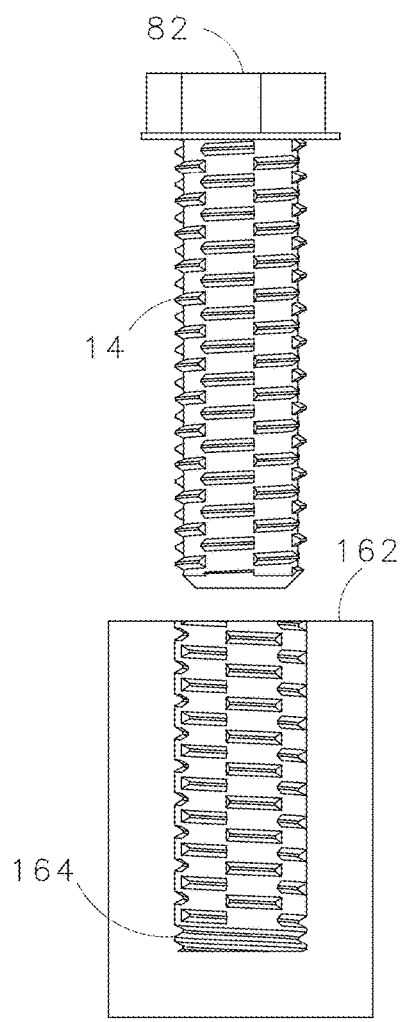
FIG. 58 is a plan view of an external step-threaded bolt and an internal step-threaded body with which it is intended to engage with the internal thread body consisting of step threads for the major part of its inside threaded length with a continuous thread or so at the very bottom of the hole for the external step-threaded bolt to engage.

Other variations of the step-thread geometry include hybrid versions in which a combination of step and continuous threads are implemented into one thread body. For example, FIG. 57 illustrates an exemplary external step-threaded body such as a bolt with step threads 14 for the length of the body except for the last thread 160 or so directly underneath the bolt head 158. This variation would enable the bolt to advance into an internal step-threaded body 22 in a rapid step-wise fashion but would provide a continuous thread at the last turn or so just under the bolt head for tightening down the bolt to the face of the internal step-threaded body. The reverse geometry would also offer this feature as illustrated in FIG. 58: i.e., an internal step-threaded body 162 could include a continuous thread 164 or so at the very bottom of the internally-threaded hole where an external step-threaded body 82 could engage that last continuous thread 164 or so in a threading mode to allow tightening. Either variation would still offer a reduced stripping capacity for the bolted joint while increasing the stability of the bolted joint when torqueing in a fastening application.

Figure 59:
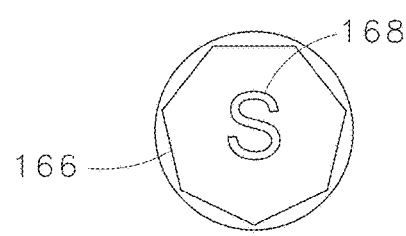
FIG. 59 is a plan view of a proposed configuration for a step-threaded bolt head consisting of seven sides and/or the capital letter "S" engraved or embossed on the head surface.

A final feature that could be integrated into step-threaded bolt is illustrated in FIG. 59 is a bolt head with seven sides 166 instead of the six sides common for hex-headed bolts. This would enable a user to quickly identify a step-threaded bolt from a conventionally-threaded bolt when viewed from the head end. Furthermore, a letter "S" 168 may be stamped or engraved upon the head top surface to further distinguish the step-threaded bolt from a conventional bolt when viewed from the head end.

While the foregoing detailed description has been given and provided with respect to certain specific embodiments, it is to be understood that the scope of the disclosure should not be limited to such embodiments, but that the same are provided simply for enablement purposes. For example, although the exemplary models presented in the disclosed figures include external and internal step thread geometry with seven thread segments/gaps per revolution of the helical thread path, it should be appreciated that any odd number of alternating thread segments/gaps of equal arc length could be used to create the step-threaded geometry in a single-start thread form without any loss of application of the concepts revealed in this disclosure. Also, the concepts presented in this disclosure for right-handed thread forms could be easily applied to left-handed thread forms without any loss of the application. As such, the breadth and spirit of the present disclosure are broader than the embodiments specifically disclosed and are limited only by the claims appended hereto. Moreover, while some features are described in conjunction with specific embodiments, these features are not limited to use with only the embodiment with which they are described, but instead may be used together with or separate from, other features disclosed in conjunction with alternate embodiments.

Prior Art

Intermittent thread geometry is known in the art. For example, U.S. Pat. No. 5,094,618 titled, "Intermittent Threaded Dental Posts" reveals intermittent thread geometry in which thread segments are separated by gaps on a helical thread path of an externally-threaded dental post. Though similar in appearance, this design differs vastly in its intent and purpose from the step thread geometry revealed in this disclosure. In summary, the '618 patent:
1. Teaches an intermittently-threaded dental post that taps into a bore drilled into a tooth stub for the purpose of establishing a support upon which a prosthetic dental structure can be built;
2. Does not specify an internal intermittently-threaded body, reflective of the intermittent thread geometry of the dental post external threads, with which the intermittently-threaded dental post would engage;
3. Requires a double-start thread form to produce an even number of thread/gap segments per revolution of the helical thread path of the dental post as compared to the step threads invention disclosed herein which specifies a single-start thread form with an odd number of thread/gap segments per revolution of the helical thread path.

These differences, and others in the '618 patent, establish significant dissimilarities between the '618 patent and the invention in this disclosure with regard to design, intent and purpose.

In addition, U.S. Pat. No. 8,845,256 titled, "Fastener and Fastener Assembly with Discontinuous Thread Form" teaches two or more external longitudinal thread forms, each of which comprises a plurality of spaced protrusions forming a separate sinusoidal path around the shaft. When said shaft is inserted into its corresponding internal mating receptacle, the fastener assembly provides two or more pitches for advancing and retracting the external thread form within the mating internal thread form. Upon review of this patent, it was determined that the thread form geometry claimed therein does not even closely resemble the step-thread geometry presented in this disclosure.

Cooperative Patent Classification searches were performed in an attempt to identify thread forms similar to the step-thread thread forms presented in this disclosure. For this purpose, thread forms and their applications were researched under the following classifications:
F16L 15/06—Screw-threaded joints characterized by the shape of the screw thread
F16B 39/30—Locking of screws, bolts, or nuts locking exclusively by special shape of the screw-thread F16B 37/085—Nuts or like thread-engaging members with at least one unthreaded portion in both the nut and the bolt F16B 33/02—Features common to bolt and nut: Shape of thread; Special thread-forms

What is claimed is:

1. A step thread assembly comprising:

an external step-threaded screw body having a single-start external screw thread with an intermittent thread comprising an odd number of alternating external thread segments and external gap segments per revolution of the thread along a helical thread path with each of the external thread segments and external gap segments having an equal arc length at a thread pitch diameter; the external thread segments and external gap segments also alternating in an axial direction of the external step-threaded screw body; the external thread segments having ends comprising a 10-degree relief angle as measured relative to a radius at each of the ends of all of the external thread segments with said angle beginning at a base and angling outward;

a first internal step-threaded screw body having a first single-start internal screw thread with an intermittent thread comprising an odd number of alternating first internal thread segments and first internal gap segments per revolution of the thread along a helical thread path with each of the first internal thread segments and first internal gap segments having an equal arc length at a thread pitch diameter; the first internal thread segments and first internal gap segments also alternating in an axial direction of the internal step-threaded screw body; the first internal thread segments having ends comprising a 10-degree relief angle as measured relative to a radius at each of the ends of all of the first internal thread segments with said angle beginning at a base and angling inwardly;

the external step-threaded screw body engaging the first internal step-threaded screw body to yield a screw device for quick assembly and disassembly in a rapid step-wise fashion;

wherein the external step-threaded screw body can be rapidly advanced or retracted relative to the internal step-threaded screw body in the step-wise fashion by applying an axial force to the external step-threaded screw body and turning the external step-threaded body in either a clockwise or a counterclockwise direction, or alternating in the clockwise and counterclockwise directions; and wherein the external step-threaded screw body will not advance or retract relative to the internal step-threaded screw body but will merely spin in place when no axial force is applied to the external step-threaded body.

2. The step-threaded assembly according to claim 1 further comprising:

a second internal step-threaded screw body having a second single-start internal screw thread with an intermittent thread comprising an odd number of alternating second internal thread segments and second internal gap segments per revolution of the thread along a helical thread path with each of the second internal thread segments and second internal gap segments having an equal arc length at a thread pitch diameter; the arc lengths of the second internal thread segments and second internal gap segments are equal to the first internal thread segments and first internal gap segments; the second internal thread segments and second internal gap segments also alternating in an axial direction of the second internal step-threaded screw body; the second internal thread segments having ends and comprising a 10-degree relief angle as measured relative to a radius at each of the ends of all of the second internal thread segments with said angle beginning at a base and angling inwardly toward the center of the second internal step-threaded screw body;

the external step-threaded screw body engaging the second internal step-threaded screw body;

wherein the first and second internal thread segments and first and second internal gap segments can be axially aligned for the external step-threaded screw body to be rapidly advanced or retracted relative to the two internal step-threaded screw bodies in the step-wise fashion; and wherein the first and second internal thread segments and the first and second internal gap segments can be rotationally offset by a distance equal to the thread or gap arc length to form a continuous uninterrupted threaded feature.

3. The step-threaded assembly according to claim 2 further comprising:

a third internal step-threaded screw body having a third single-start internal screw thread with an intermittent thread comprising an odd number of alternating third internal thread segments and third internal gap segments per revolution of the thread along a helical thread path with each of the third internal thread segments and third internal gap segments having an equal arc length at a thread pitch diameter; the arc lengths of the third internal thread segments and third internal gap segments are equal to the arc lengths of the first internal thread segments and first internal gap segments; the third internal thread segments and third internal gap segments also alternating in an axial direction of the third internal step-threaded screw body; the third internal thread segments having ends comprising a 10-degree relief angle as measured relative to a radius at each of the ends of all of the third internal thread segments with said angle beginning at a base and angling inwardly;

the external step-threaded screw body engaging the third internal step-threaded screw body;

wherein the first, second and third internal thread segments and the first, second and third internal gap segments can be axially aligned for the external step-threaded screw body to be rapidly advanced or retracted relative to the three internal step-threaded screw bodies in the step-wise fashion; and wherein one of the first, second and third internal thread segments and one of the first, second and third internal gap segments can be rotationally offset by a distance equal to the thread and gap arc length to form a second continuous uninterrupted threaded feature.

4. The step-threaded assembly according to claim 1 further comprising:

at least a last thread on the external step-threaded screw body or in the first internal step-threaded screw body is continuous so as to aid in a stabilization of the assembly when an external step-threaded body is tightened down into an internal step-threaded body.

5. The step-threaded assembly according to claim 2 further comprising a rapid advance and retract clamping device.

6. The step-threaded assembly according to claim 5 wherein said clamping device is a C-clamp.

7. The step-threaded assembly according to claim 2 further comprising a device to control the axial alignment and rotational offset of the first and second internal thread segments and gap segments.

* * * * *